(12) United States Patent
Goto et al.

(10) Patent No.: US 8,482,800 B2
(45) Date of Patent: Jul. 9, 2013

(54) IMAGE PROCESSING APPARATUS AND IMAGE PROCESSING METHOD

(75) Inventors: Fumitaka Goto, Tokyo (JP); Akitoshi Yamada, Yokohama (JP); Mitsuhiro Ono, Tokyo (JP); Rie Kajihara, Minoh (JP); Okinori Tsuchiya, Yokohama (JP); Ayumi Sano, Kawasaki (JP); Tomokazu Ishikawa, Kawasaki (JP); Takashi Fujita, Kawasaki (JP); Fumihiro Goto, Kawasaki (JP); Shigeyasu Nagoshi, Yokohama (JP); Akihiko Nakatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 12/955,418

(22) Filed: Nov. 29, 2010

(65) Prior Publication Data
US 2011/0141176 A1 Jun. 16, 2011

(30) Foreign Application Priority Data
Dec. 11, 2009 (JP) ................................ 2009-281953

(51) Int. Cl.
*H04N 1/40* (2006.01)
*G06K 1/00* (2006.01)

(52) U.S. Cl.
USPC .............................. 358/3.01; 358/2.1; 358/1.9

(58) Field of Classification Search
USPC ........................................... 358/3.01, 2.1, 1.9
See application file for complete search history.

(56) References Cited

U.S. PATENT DOCUMENTS

| 5,594,478 | A | 1/1997 | Matsubara et al. |
|---|---|---|---|
| 5,604,520 | A | 2/1997 | Matsubara et al. |
| 5,831,642 | A | 11/1998 | Matsubara et al. |
| 6,511,143 | B1 | 1/2003 | Ishikawa et al. |
| 6,511,146 | B2 | 1/2003 | Ishikawa et al. |
| 2009/0161165 | A1* | 6/2009 | Fujimoto et al. ............... 358/2.1 |

FOREIGN PATENT DOCUMENTS

JP 2000-103088 A 4/2000

* cited by examiner

*Primary Examiner* — Charlotte M Baker
(74) *Attorney, Agent, or Firm* — Fitzpatrick, Cella, Harper & Scinto

(57) ABSTRACT

In image processing it is possible to adequately reduce density unevenness and graininess according to the duty of the image data. More specifically, when dividing multi-valued data and generating 2-pass multi-pass printing data, in addition to the divided multi-valued data for each of the two passes, divided multi-valued data that is common to both of the two passes is also generated. Moreover, the quantized data of that common multi-valued data is reflected on the quantized data of each pass. Furthermore, when generating quantized data, the division ratio when generating common data in the division of multi-valued data is set according to the duty (gradation value) of the multi-valued data. By doing so it becomes possible to adequately reduce the density unevenness and graininess according to the duty of the image data.

11 Claims, 16 Drawing Sheets

MAIN SCANNING DIRECTION

|   | ● | 7 |
|---|---|---|
| 1 | 3 | 5 |

● THE DOT DENOTES THE OBJECT PIXEL

FIG.7A

|   | ● | 9 | 3 |
|---|---|---|---|
| 5 | 9 | 3 |   |
|   | 3 |   |   |

● THE DOT DENOTES THE OBJECT PIXEL

FIG.7B

|   |   | ● | 2 | 1 |
|---|---|---|---|---|
| 1 | 1 | 2 | 1 |   |

● THE DOT DENOTES THE OBJECT PIXEL

FIG.7C

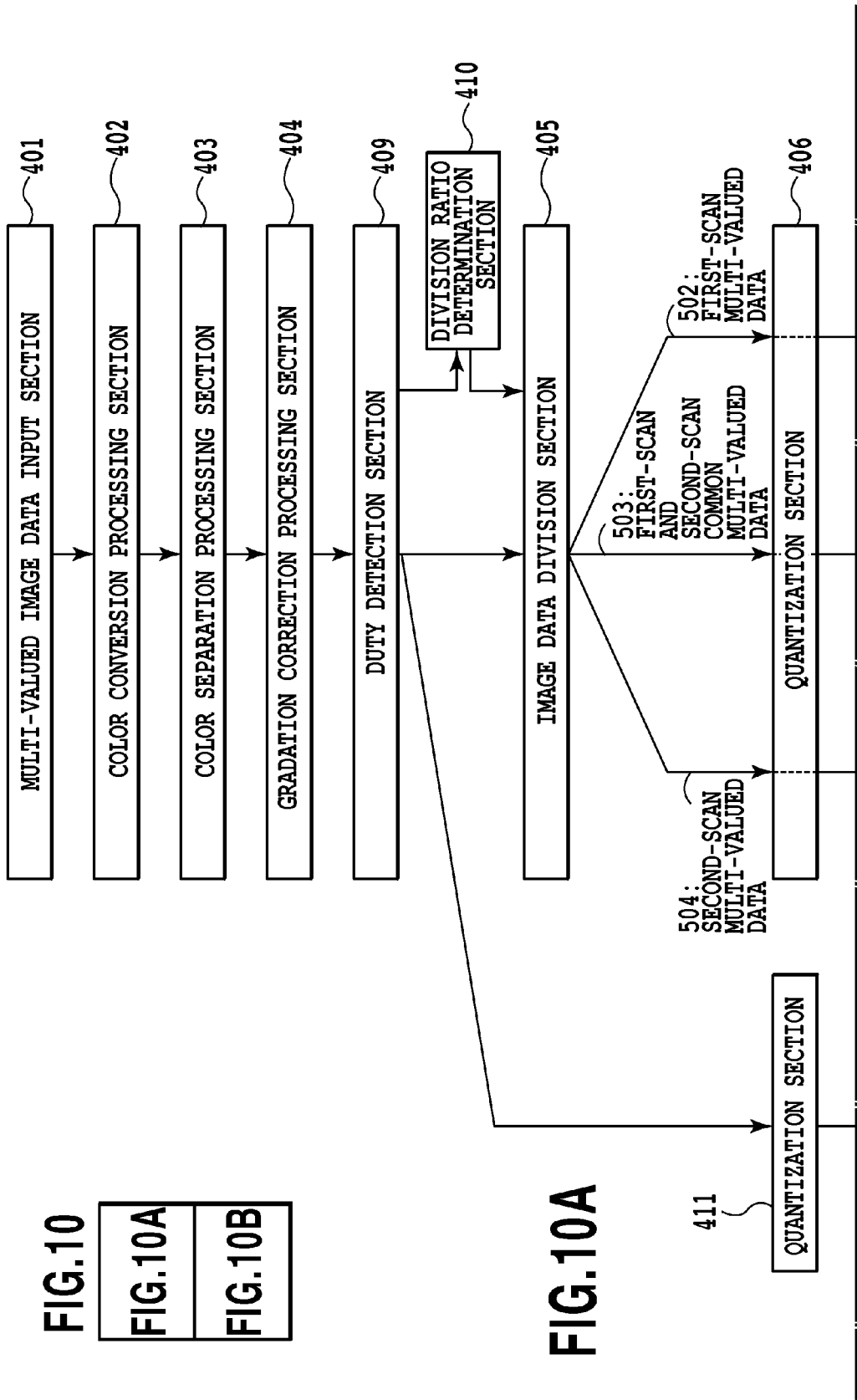

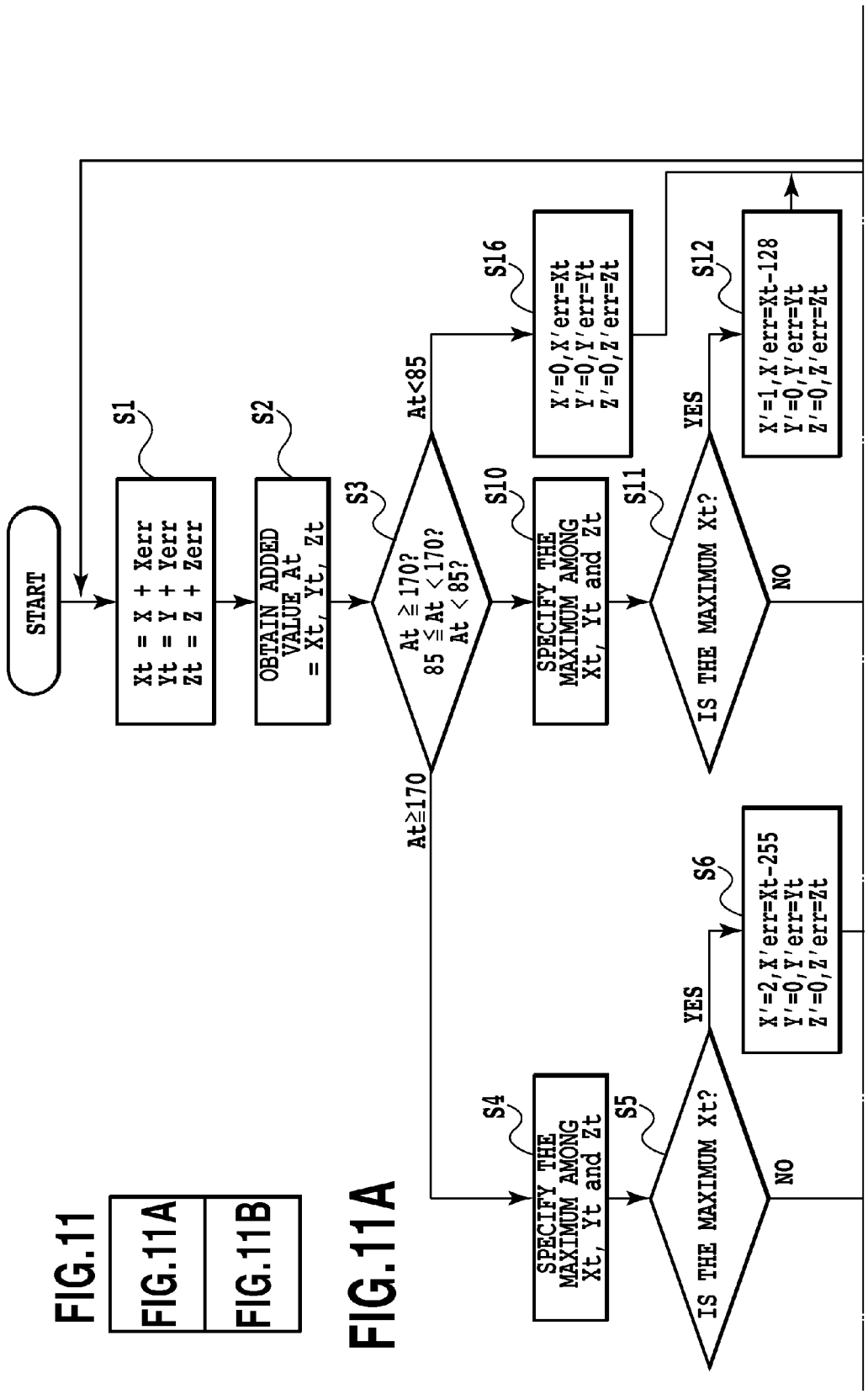

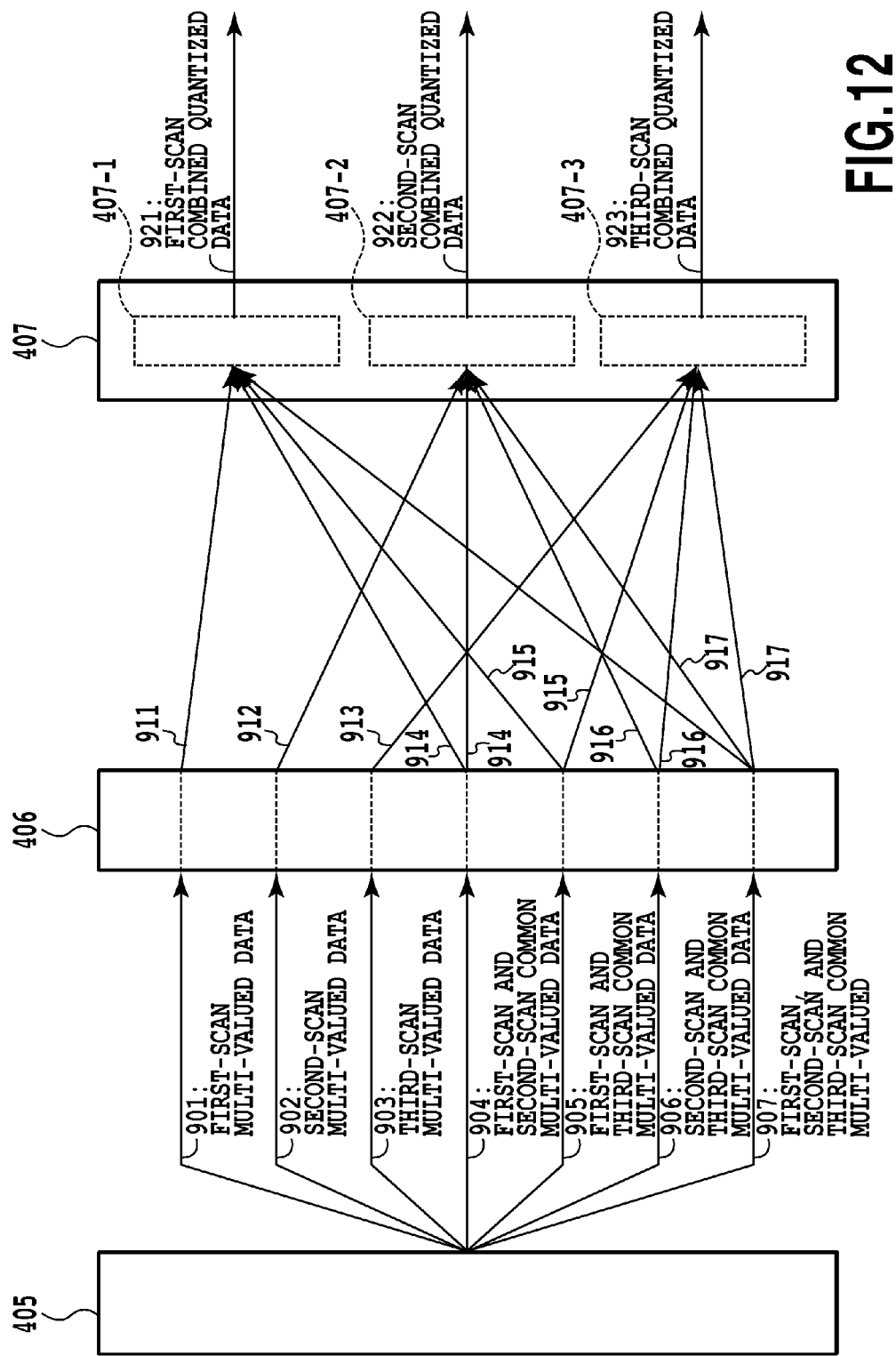

IMAGE PROCESSING APPARATUS AND IMAGE PROCESSING METHOD

BACKGROUND OF THE INVENTION

1. Field of the Invention

The present invention relates to an image processing apparatus and image processing method, and more particularly to a technique for generating data for completing printing in the same area of a printing medium by moving a printing head a plurality of times relative to the same area of the printing medium.

2. Description of the Related Art

As this kind of technique, a multi-pass printing method is known for completing an image to be printed in the same area of a printing medium by scanning that same area of the printing medium a plurality of times with a printing head. With this technique, it is possible to reduce density unevenness and stripes in an image. However, even though the multi-pass printing method is employed, there is a possibility that a shift of the dot printing position will occur between the plurality printing scans due to fluctuation in the conveyance amount of the printing medium. Such shift causes fluctuation in the dot coverage, and as a result, image defects such as density fluctuation or density unevenness may occur.

In addition, the fluctuation in the conveyance amount of the printing medium mentioned above differs according to the position of the printing medium on the conveying path of the printing medium. For example, when printing over the entire surface of a printing medium without setting margins, or in other words, performing so-called margin-less printing, the printing position is located on the printing medium where printing is performed by the printing head as the printing medium is conveyed along the conveying path by only one pair of conveying rollers that are provided on both the upstream side and downstream side of the printing area. In such a printing position, the conveyance precision is low and it is easy for fluctuation in the conveyance amount to occur. On the other hand, when the printing medium is conveyed in a state of being held by both of a pair of conveying rollers on the upstream side and downstream side, the conveyance precision is high and it is difficult for fluctuation of the conveyance amount to occur. Moreover, it is known that during conveyance, when the printing medium enters or leaves the nip portion of a pair of conveying rollers, there is a relatively large fluctuation in the conveyance amount.

A method is known as a technique for reducing the image defects caused by the shift of the dot printing position due to the above described fluctuation of the conveyance amount in which image data are divided into respective data corresponding to different scans in the stage of multi-valued image data before binarization, and then the respective divided multi-valued image data are independently binarized (Japanese Patent Laid-Open No. 2000-103088). FIG. 13A is a diagram illustrating the arrangement of dots that are printed based on image data that are processed by the method disclosed in Japanese Patent Laid-Open No. 2000-103088. In the figure, the black dots 551 are dots that are printed in a first printing scan, white dots 552 are dots that are printed in a second printing scan and gray dots 553 are dots that are printed by overlapping of dots that are printed in the first printing scan and second printing scan. In other words, the technique disclosed in Japanese Patent Laid-Open No. 2000-103088 is a technique of generating overlapping dots by reducing mutual complementarity or exclusivity of dots that are printed in a plurality of printing scans.

With this dot arrangement, even though a dot group printed in a first printing scan and a dot group printed in a second printing scan become shifted in the main scanning direction or sub scanning direction, there is not much fluctuation in the dot coverage on the printing medium, and as a result, it is possible to reduce the image defects mentioned above. This is because even though portions, where dots that are printed in the first printing scan and dots that are printed in the second printing scan overlap, newly appear, there are portions where two dots that were originally supposed to be printed such that they overlap do not overlap. More specifically, conventionally, by using a mask on normally quantized data, print data are divided, as well as complementarity and exclusivity is given to data that are to be printed in different printing scans. On the other hand, the method disclosed in Japanese Patent Laid-Open No. 2000-103088 is a method in which multi-valued data are divided in the multi-valued data stage into a plurality of multi-valued data that correspond to different printing scans, and the plurality of multi-valued data are each independently quantized so that quantized data to be used in the respective printing scans are obtained. This allows complementarity between dots that are printed in different printing scans to be decreased, and overlapping dots are caused to occur among the dots that are printed in a plurality of printing scans.

However, in the method disclosed in Japanese Patent Laid-Open No. 2000-103088 it is not possible to control the overlap amount of dots that are printed in a plurality of printing scans. As a result, the number of overlapping dots may become excessive and the graininess of the image may be increased, or conversely, the number of overlapping dots could be too few and the aforementioned density fluctuation may not be sufficiently suppressed.

The inventors of the present application placing attention on making it possible to control the amount of the dot overlap by generating data that is reflected in all the quantized data of the different printing scans in common with each other.

Meanwhile, the degree of graininess or the degree of density unevenness (density fluctuation), which appear in a printed image differs depending on the gradation values for each pixel in the image, or in other words, depending on the dot duty, which is the percentage of the number of dots that are formed with respect to a certain surface area. More specifically, how much dot overlapping is adequate for suppressing density unevenness due to the above-mentioned conveyance error when conveying printing medium differs depending on the dot duty. In addition, this dot overlap amount also affects graininess.

When the degree of density unevenness and graininess that appear in a printed image differs depending on the duty as described above, applying a process of generating data that commonly reflects on the entire printed data is not preferred. In other words, when applying a process of generating data that commonly reflects over the entire printed data, there is a possibility that density unevenness and graininess will become worse. Moreover, performing processes of dividing and quantizing multi-valued image data when generating data having duty for which the processes of dividing and quantizing is not necessary, there is a possibility that the processing load will increase or that the processing speed will decrease.

SUMMARY OF THE INVENTION

The object of the present invention is to provide an image processing apparatus and image processing method that are capable of suitably reducing the density unevenness or graininess described above according to the gradation value (duty) of the image data.

In a first aspect of the present invention, there is provided an image processing apparatus that, for printing an image on a pixel area of a printing medium by performing a plurality of relative scans between a printing unit for ejecting inks of a plurality of colors and the printing medium, processes multi-valued image data that corresponds to the image to be printed on the pixel area, the apparatus comprising: a generating unit configured to generate respective multi-valued data that correspond to each of the plurality of relative scans and multi-valued data that corresponds commonly to at least two relative scans among the plurality of relative scans, by dividing the multi-valued image data according to division ratios according to a gradation value of the multi-valued image data; a quantization unit configured to perform quantization processing for each of the multi-valued data generated by the generating unit to generate respective quantized data that correspond to each of the plurality of two relative scans and quantized data that corresponds commonly to the at least two relative scans among the plurality of relative scans; and a combination unit configured to combine the quantized data generated by the quantization unit for each corresponding relative scan to generate combined quantized data that corresponds to each of the plurality of relative scans.

In a second aspect of the present invention, there is provided an image processing apparatus that, for printing an image on a pixel area of a printing medium by performing a plurality of relative scans between a printing unit for ejecting inks of plurality of colors and the printing medium, processes multi-valued image data that corresponds to the image to be printed on the pixel area, the apparatus comprising: a selecting unit configured to select a second processing mode in the case that the gradation value of the multi-valued image data is smaller than a first threshold value or is greater than a second threshold value that is greater than the first threshold value, and select a first processing mode in the case that the gradation value of the multi-valued image data is a value between the first threshold value and the second threshold value; and a processing portion configured to perform the processing mode selected by the selecting unit, wherein the first processing mode is a mode that performs an image processing including (A) a first division process for dividing the multi-valued image data into respective multi-valued data that correspond to each of the plurality of relative scans and multi-valued data that corresponds commonly to at least two relative scans among the plurality of relative scans, (B) a first quantization process for quantizing each of the multi-valued data obtained by the first division process to generate respective quantized data that correspond to each of the plurality of relative scans and quantized data that corresponds commonly to the at least two relative scans among the plurality of relative scans, and (C) a combination process for combining the quantized data generated by the first quantization process for each corresponding relative scan to generate combined quantized data that corresponds to each of the plurality of relative scans, and the second processing mode is a mode that performs an image processing including (D) a second quantization process for quantizing the multi-valued data to generate quantized data, and (E) a second division process for dividing the quantized data generated by the second quantization process into respective divided quantized data that correspond to each of the plurality of relative scans.

In a third aspect of the present invention, there is provided an image processing method of, for printing an image on a pixel area of a printing medium by performing a plurality of relative scans between a printing unit for ejecting inks of plurality of colors and the printing medium, processing multi-valued image data that corresponds to the image to be printed on the pixel area, the apparatus comprising: a generating step of generating respective multi-valued data that correspond to each of the plurality of relative scans and multi-valued data that corresponds commonly to at least two relative scans among the plurality of relative scans, by dividing the multi-valued image data according to division ratios according to a gradation value of the multi-valued image data; a quantization step of perform quantization processing for each of the multi-valued data generated by the generating step to generate respective quantized data that correspond to each of the plurality of relative scans and quantized data that corresponds commonly to the at least two relative scans among the plurality of relative scans; and a combination step of combining the quantized data generated by the quantization step for each corresponding relative scan to generate combined quantized data that corresponds to each of the plurality of relative scans.

In a fourth aspect of the present invention, there is provided an image processing method of, for printing an image on a pixel area of a printing medium by performing a plurality of relative scans between a printing unit for ejecting inks of plurality of colors and the printing medium, processing multi-valued image data that corresponds to the image to be printed on the pixel area, the apparatus comprising: a selecting step of selecting a second processing mode in the case that the gradation value of the multi-valued image data is smaller than a first threshold value or is greater than a second threshold value that is greater than the first threshold value, and selecting a first processing mode in the case that the gradation value of the multi-valued image data is a value between the first threshold value and the second threshold value; and a processing step of performing the processing mode selected by the selecting step, wherein the first processing mode is a mode that performs an image processing including (A) a first division process for dividing the multi-valued image data into respective multi-valued data that correspond to each of the plurality of relative scans and multi-valued data that corresponds commonly to at least two relative scans among the plurality of relative scans, (B) a first quantization process for quantizing each of the multi-valued data obtained by the first division process to generate respective quantized data that correspond to each of the plurality of relative scans and quantized data that corresponds commonly to the at least two relative scans among the plurality of relative scans, and (C) a combination process for combining the quantized data generated by the first quantization process for each corresponding relative scan to generate combined quantized data that corresponds to each of the plurality of relative scans, and the second processing mode is a mode that performs an image processing including (D) a second quantization process for quantizing the multi-valued data to generate quantized data, and (E) a second division process for dividing the quantized data generated by the second quantization process into respective divided quantized data that correspond to each of the plurality of relative scans.

With the construction described above, multi-valued image data having a gradation value of image is divided at division ratios according to that gradation value. Thereby, decreasing the density unevenness or graininess can be adequately performed in accordance with the gradation value of the multi-valued image data.

Further features of the present invention will become apparent from the following description of exemplary embodiments (with reference to the attached drawings).

BRIEF DESCRIPTION OF THE DRAWINGS

FIGS. 7A to 7C are diagrams expressing an error-distribution matrix that illustrates error-distribution coefficients for peripheral pixels when performing an error diffusion process;

FIG. 12 is a block diagram illustrating construction for performing a printing data generation process (image processing) for performing 3-pass printing.

DESCRIPTION OF THE EMBODIMENTS

Embodiments of the present invention will be described in detail below with reference to the drawings. The embodiments explained below relate to an inkjet printing apparatus as an example. However, the present invention is not limited to an inkjet printing apparatus. As long as the apparatus uses a method of printing an image on a printing medium by a printing unit during relative scan between a printing head for printing dots, and the printing medium, the invention can also be applied to the apparatus other than an inkjet printing apparatus.

Figure 2:
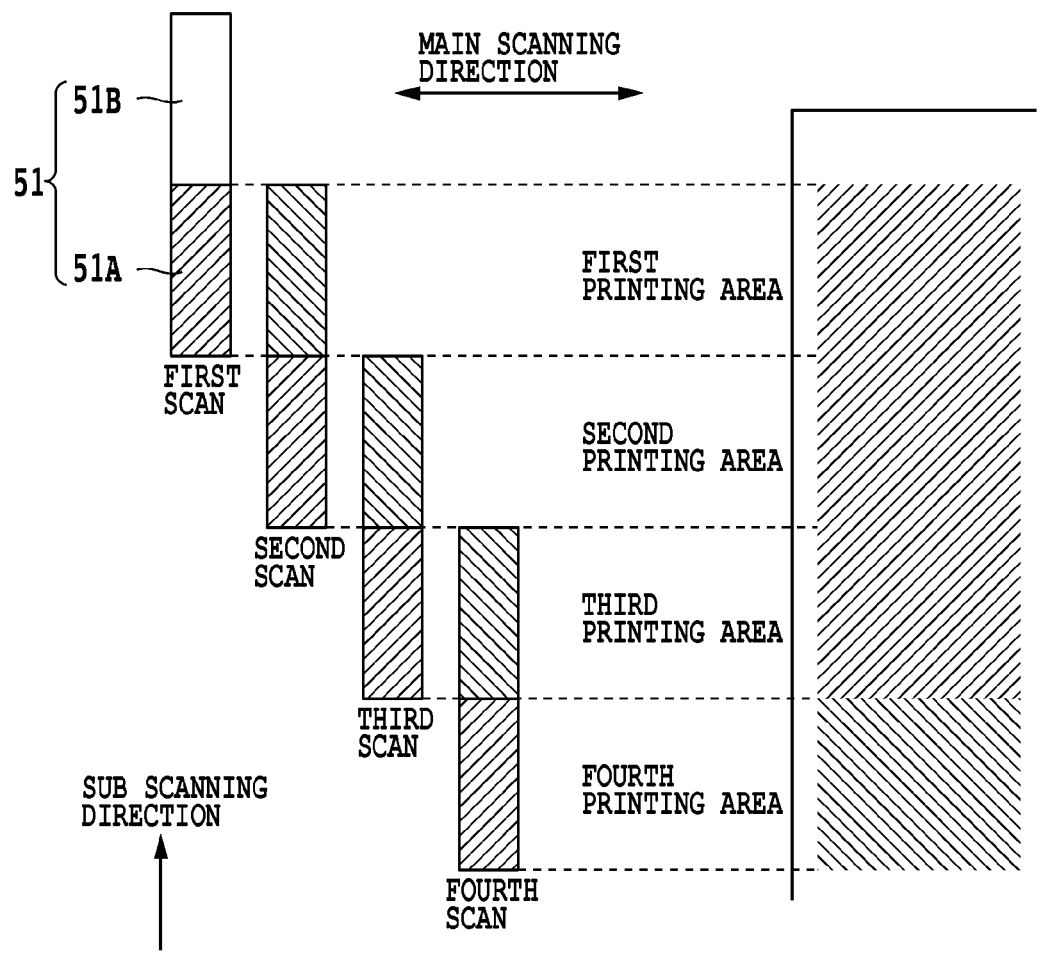
FIG. 2 is a diagram explaining two-pass multi-pass printing.

In this specification, "multi-pass printing" refers to a printing method in which an image to be printed in the same area of a printing medium is completed by a plurality of relative scans (relative movement) between a printing head and printing medium. "Relative scan (relative movement) between a printing head and printing medium" refers to an operation of a printing head moving (scanning) relative to a printing medium, or a printing medium moving (being conveyed) relative to a printing head. On a micro level, the term "same area" refers to "one pixel area", and on a macro level refers to an "area that can be printed during one relative scan". A "pixel area (may simply be called a "pixel")" refers to the smallest unit of area for which gradation expression is possible using multi-valued image data. On the other hand, an "area that can be printed during one relative scan" refers to an area on a printing medium over which a printing head passes during one relative scan, or is an area that is smaller than this area (for example, one raster area). For example, in a serial printing apparatus, when an M-pass (M is an integer 2 or greater) multi-pass mode is executed as illustrated in FIG. 2, on a macro level the same area can be defined as one printing area in the figure (an area having a nozzle array width of 1/M).

Hereinafter, the "relative scan" will be simply referred to as a "scan". For example, in the case of three-pass multi-pass printing, relative scan is performed three times (first relative scan, second relative scan, third relative scan) for one pixel area, and these first through third relative scan are called a "first scan", "second scan" and "third scan", respectively.

<Printing Apparatus Construction>

Figure 1A:
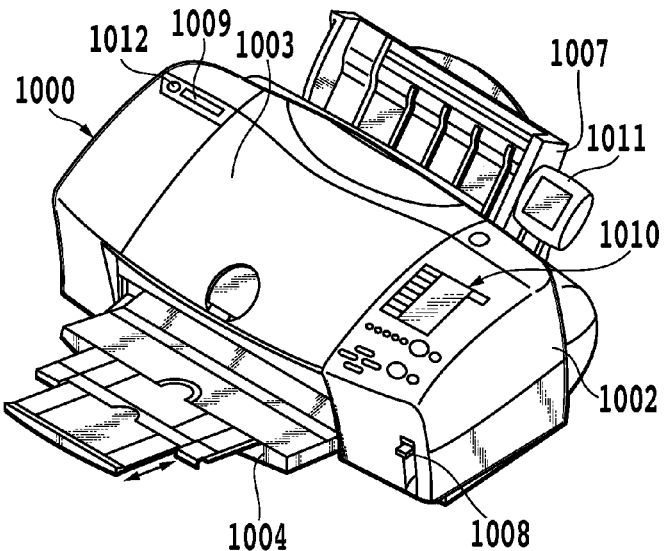
FIGS. 1A to 1C are views explaining the construction of a printer that functions as the image processing apparatus of the present invention.

FIG. 1A is a perspective view of a photo-direct printer (hereafter referred to as a PD printer) 1000 that can be applied as the image processing apparatus of the present invention. The PD printer 1000 has a function for receiving data from a host computer (PC) to perform printing, a function of directly reading an image that is stored on a memory medium such as a memory card to perform printing, and a function of receiving an image from a digital camera, PDA or the like to perform printing.

In FIG. 1A, reference numeral 1004 denotes a discharge tray on which printed paper can be stacked, and reference numeral 1003 denotes an access cover that the user can open or close when replacing the printing head cartridge or ink tank that are housed inside the main unit. Menu items for setting various printing conditions (for example, type of printing medium, image quality, etc.) are displayed on a operation panel 1010 that is provided on the upper case 1002, and the user can set these items according to the type and usage of the image to be output. Reference numeral 1007 denotes an auto feeding unit that automatically feeds printing medium to the inside of the printer, reference numeral 1009 denotes a card slot into which an adapter, in which a memory card can be mounted, is inserted, and reference numeral 1012 denotes a USB terminal for connecting a digital camera. A USB connector for connecting a PC is provided on the rear surface of the PD printer 1000.

Figure 1B:
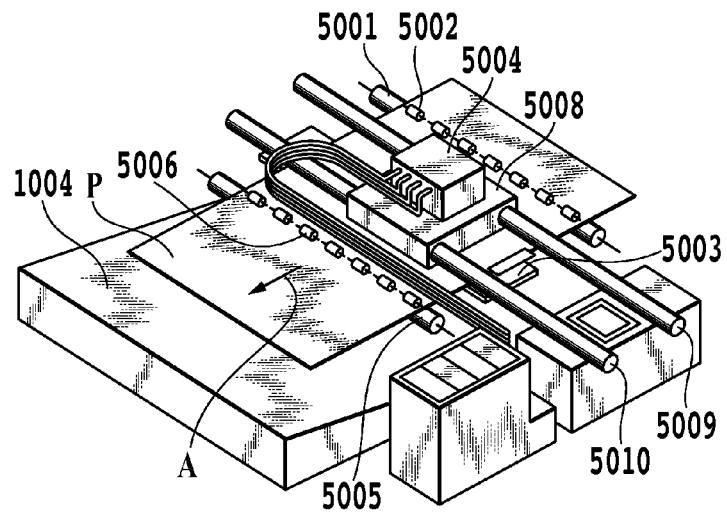

FIG. 1B is a perspective view illustrating the internal construction of the PD printer. A printing medium P is fed by the auto feeding unit 1007 to the nip portion between the conveying roller 5001 that is located on the conveying path, and a pinch roller 5002 that follows the conveying roller. After that, the printing medium P is conveyed by the rotation of the conveying roller 5001 in the direction of arrow A (sub scanning direction) in the figure while being guided and supported on a platen 5003. The pinch roller 5002 elastically presses toward the conveying roller 5001 by a pressure unit such as a spring (not shown in the figure). The conveying roller 5001 and pinch roller 5002 are component elements of a first conveying unit that is located on the upstream side in the conveyance direction of the printing medium.

The platen 5003 is located at the printing position and is opposed to a surface of the inkjet type printing head 5004 where the ejection ports are formed, and by supporting the rear surface of the printing medium P, maintains a constant distance between a front surface of the printing medium P and the ejection port surface. The printing medium P that is conveyed and printed over the platen 5003 is conveyed in the direction A with being held between a discharge roller 5005 and spurs 5006, which are rotating bodies that follow the discharge roller 5005, and is discharged into the discharge tray 1004 from the platen 5003. The discharge roller 5005 and spurs 5006 are component elements of a second conveying unit that is located on the downstream side in the conveying direction of the printing medium.

As described above, as construction for conveying the printing medium inside the printer of the embodiments, a pair of a conveying roller 5001 and a pinch roller 5002 are provided on the upstream side of the printing head, and a pair of a discharge roller 5005 and spurs 5006 are provided on the downstream side.

The printing head 5004 is mounted on a carriage 5008 such that it is removable, and such that the ejection port surface faces the platen 5003 and printing medium P. The driving force of a carriage motor E0001 moves the carriage 5008 back and forth along two guide rails 5009 and 5010, and during this movement, the printing head 5004 executes the ink ejection operation according to print signals. The direction in which the carriage 5008 moves is a direction that crosses the direction (direction of arrow A) in which the printing medium P is conveyed. Printing is performed on the printing medium P by repeating the main scanning (movement during printing) of the carriage 5008 and printing head 5004 and conveyance (sub scanning) of the printing medium P alternately.

Figure 1C:
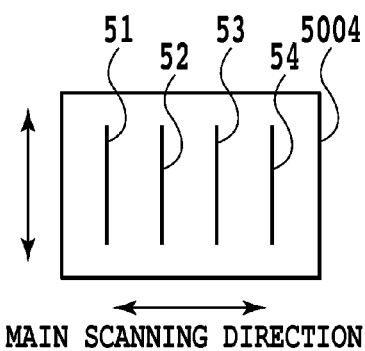

FIG. 1C is a schematic diagram when viewing the printing head 5004 from the surface on which the ejection ports are formed. In the figure, reference numeral 51 denotes a cyan nozzle array, reference numeral 52 denotes a magenta nozzle array, reference numeral 53 denotes a yellow nozzle array and reference numeral 54 denotes a black nozzle array. The width in the sub scanning direction of each of the nozzle arrays is d, and it is possible to perform printing of a width d during one scan.

Each of the nozzle arrays 51 to 54 are constructed such that there are 1200 nozzles arranged in the sub scanning direction at 600 dpi (dots/inch), or in other words at intervals of approximately 42 μm. Each individual nozzle comprises an ejection port, an ink path for guiding the ink to the ejection port, and an electro-thermal conversion element that causes film boiling to occur in the ink near the ejection port. With this construction, by applying a voltage pulse to each individual electro-thermal conversion element according to an ejection signal, film boiling occurs in the ink near the electro-thermal conversion elements, and an amount of ink that corresponds to the growth of generated bubble is ejected from the ejection ports as droplets.

<Multi-Pass Printing>

The printing apparatus of the present embodiment is can perform multi-pass printing, and in this printing, an image is formed step-by-step by a plurality of printing scans to an area in which the printing head 5004 can print in one time of printing scan. An image is formed step-by-step by performing a conveyance operation of a small amount that is less than the width d of the printing head 5004 between successive printing scans and differentiating nozzles used in each step. This allows density unevenness or stripes that occur due to variations in the ejection characteristics of the nozzles to be reduced. Whether or not to perform multi-pass printing, or the number of multi-passes (number of printing scans performed for the same area) is suitably set according to image information that is input from the operation panel 1010 by the user, or that is received from a host device.

Next, FIG. 2 will be used to explain an example of multi-pass printing that can be executed by the printing apparatus described above. Here, two-pass printing will be explained as an example of multi-pass printing; however, the present invention is not limited to two-pass printing, and the multi-pass printing may also be M (M is an integer 2 or greater)-pass printing such as three-pass, four-pass, eight-pass, sixteen-pass printing and the like. In the present invention, the "M-pass mode (M is an integer 2 or greater)" that can be preferably applied is a mode in which printing is performed in the same area of a printing medium by M scans of a printing element group between which the conveyance of the printing medium having a smaller amount than the width of the array range of printing elements intervenes. In the M-pass mode, the amount of one conveyance of the printing medium is preferably set to be equal to an amount corresponding to 1/M the width of the array range of the printing elements, and by performing this setting, the width in the conveyance direction of the same area is equal to a width that corresponds to the amount of one conveyance of the printing medium.

FIG. 2 is a diagram schematically illustrating the state of two-pass printing, and showing the relative positional relationship between the printing head 5004 and printing area in the case of printing in a first printing area to fourth printing area, which correspond to four same areas. In FIG. 2, only one nozzle array (printing element group) 51 of one color of the printing head 5004 shown in FIG. 1C is shown. In addition, herein after, of a plurality of nozzles (printing elements) composing the nozzle array (printing element group) 51, the nozzle group that is located on the upstream side in the conveyance direction is called an upstream side nozzle group 51A, and the nozzle group that is located on the downstream side in the conveyance direction is called a downstream side nozzle group 51B. Moreover, the width in the sub scanning direction (conveying direction) of each of the same areas (each printing area) is equal to the width (640 nozzle widths) that corresponds approximately to half of the width (1280 nozzle widths) of the array range of the plurality of printing elements of the printing head.

In the first scan, only part of the image to be printed in the first printing area is printed using the upstream side nozzle group 51A. The gradation value of the image data that are printed by this upstream side nozzle group 51A is reduced to approximately half of the gradation value of original image data (multi-valued image data that corresponds to the image to be finally printed in the first printing area), for each individual pixel. After the above described printing by the first scan is complete, the printing medium is conveyed along the Y direction by just the distance corresponding to 640 nozzles.

Next, in a second scan, only part of the image that is to be printed in a second printing area is printed using the upstream side nozzle group 51A, and the image to be printed in the first printing area is completed using the downstream side nozzle group 51B. For the image data that is printed by this downstream side nozzle group 51B as well, the gradation value is reduced to approximately half of the gradation value of the original image data (multi-valued image data that corresponds to the image to be finally printed in the first printing area). This allows the image data whose gradation value has been reduced to approximately ½ to be printed two times in the first printing area, and therefore the gradation value of the original image data is conserved. After the above described printing by the second scan is completed the printing medium is conveyed in the Y direction just a distance equal to the amount of 640 nozzles.

Next, in a third scan, only part of the image that is to be printed in the third printing area is printed using the upstream side nozzle group 51A, and the image to be printed in the second printing area is completed using the downstream side nozzle group 51B. After that, the printing medium is conveyed in the Y direction just a distance corresponding to the amount of 640 nozzles. Finally, in a fourth scan, only part of the image that is to be printed in the fourth printing area is printed using the upstream side nozzle group 51A, and the image to be printed in the third printing area is completed using the downstream side nozzle group 51B. After that, the printing medium is conveyed in the Y direction just a distance corresponding to the amount of 640 nozzles. The same printing operation is also performed for other printing areas. By repeating the above described printing main scan and conveyance operation described above, the two-pass printing is performed for all of the printing areas.

<Electrical Specifications of the Control Unit>

Figure 3:
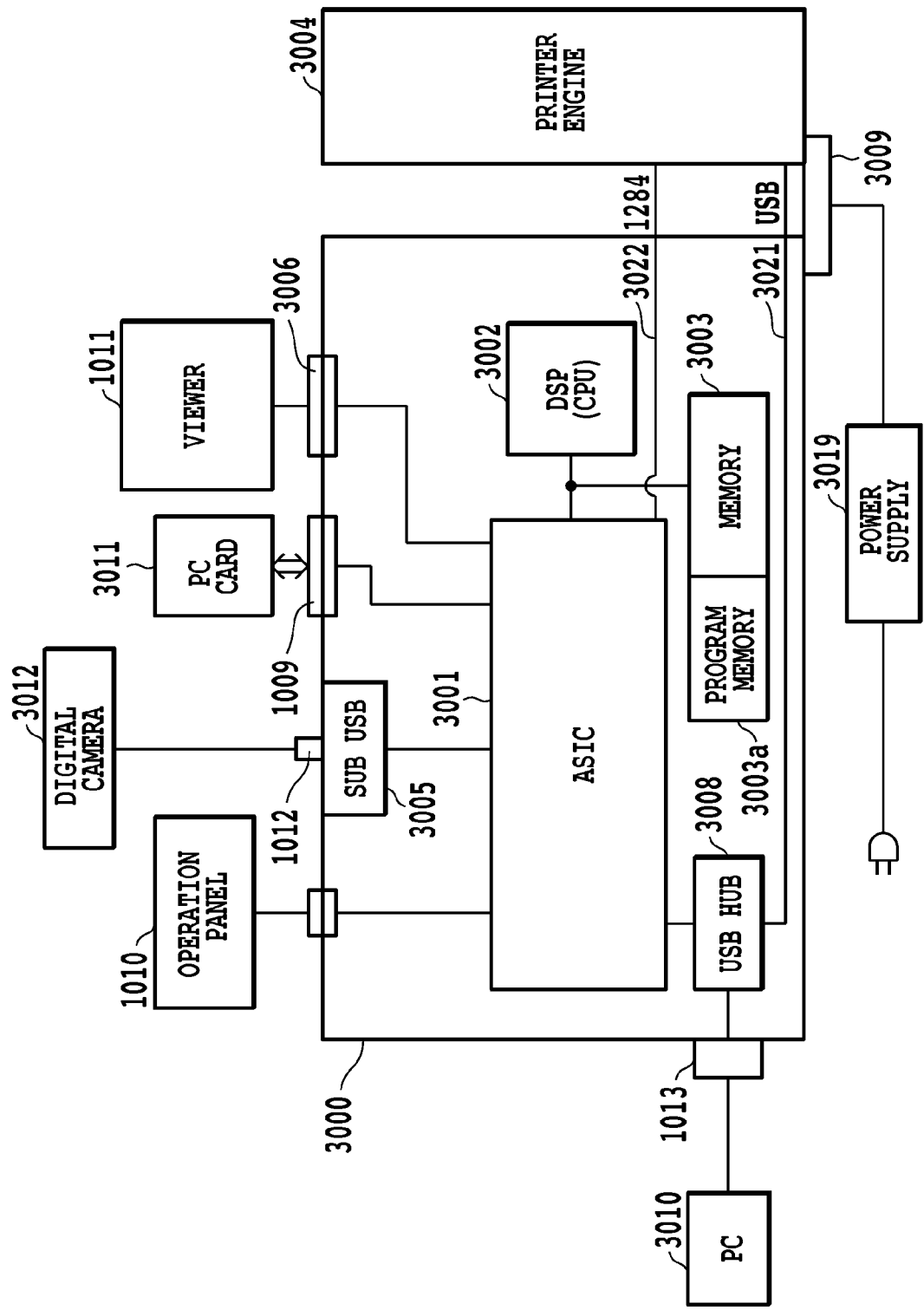
FIG. 3 is a block diagram illustrating the construction of the main part related to control of the printer in FIG. 1.

FIG. 3 is a block diagram illustrating the configuration of the main part related to control of the PD printer 1000 shown in FIG. 1A. In FIG. 3 the same reference numbers are given to parts that are common to those in the aforementioned figures, and an explanation of those parts is omitted. As will be clear from the following explanation, the PD printer 1000 functions as an image processing apparatus.

In FIG. 3, reference numeral 3000 denotes a control unit (control board) and reference numeral 3001 denotes an image processing ASIC (specially customized LSI). Reference numeral 3002 denotes a DSP (digital signal processor), which includes an internal CPU to perform various control processing and image processing shown in FIGS. 4A and 4B and other figures. Reference numeral 3003 denotes a memory and the memory 3003 includes a program memory 3003a that stores the control programs for the CPU of the DSP 3002, a RAM area that stores programs during execution, and a memory area that functions as a work memory the stores image data and the like. Reference numeral 3004 denotes a printer engine, and in this embodiment the printer engine for an inkjet printing apparatus that prints color images using a plurality of colors of color ink is mounted. Reference numeral 3005 denotes a USB connector that is used as a port for connecting a digital camera (DSC) 3012. Reference numeral 3006 denotes a connector for connecting a viewer 1011. Reference numeral 3008 denotes a USB hub (USB HUB), and when the PD printer 1000 performs printing based on image data from the PC 3010, the USB hub passes the data from the PC 3010 as is and outputs that data to the printer engine 3004 via the USB 3021. Thereby, the connected PC 3010 is able to execute printing by directly exchanging data and signals with the printer engine 3004 (functions as a normal PC printer). Reference numeral 3009 denotes a power-supply connector, and by way of the power supply 3019 inputs DC voltage that as been converted from commercial AC. Reference numeral 3010 denotes a typical personal computer, reference numeral 3011 denotes the aforementioned memory card (PC card), and reference numeral 3012 denotes a digital camera (DSC). The exchange of signals between the control unit 3000 and printer engine 3004 is performed by way of the aforementioned USB 3021 or an IEEE 1284 bus 3022.

(First Embodiment)

A first embodiment of the present invention relates to a data generation mode which when dividing multi-valued data to generate multi-valued data for the multi-pass printing of two-pass that is described above referring to FIG. 2, generates divided multi-valued data that is common for two passes as well as divided multi-valued data for each of the two-pass. In addition, the data generation mode of this embodiment reflects the quantized data of the common multi-valued data on quantized data for each pass. Furthermore, the data generation of the present invention determines a division ratio for dividing the multi-valued data according to gradation values or duty of the multi-valued image data.

Figures 4, 4A, 4B:
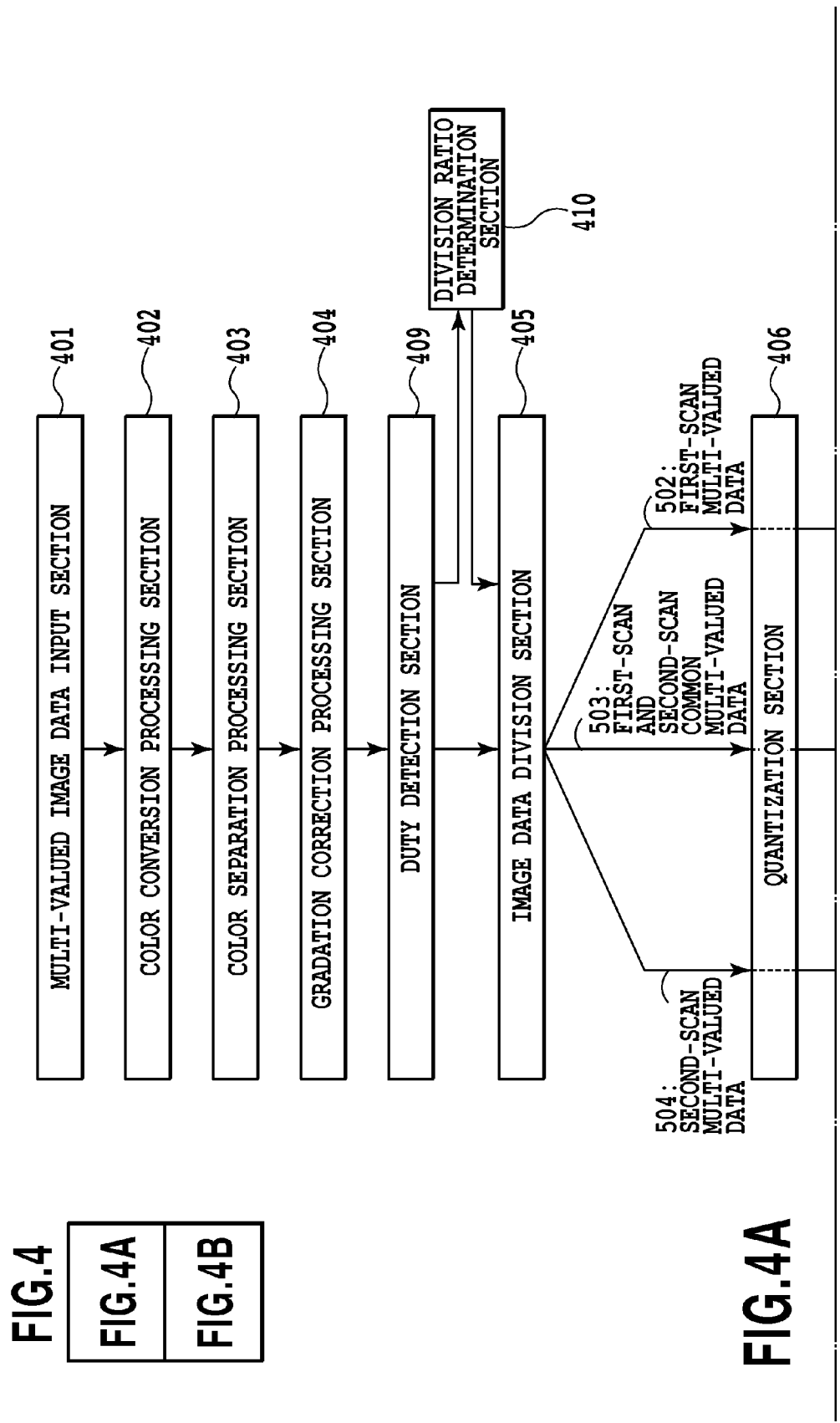
FIG. 4 is a diagram showing a relationship between FIG. 4A and FIG. 4B, and FIGS. 4A and 4B are block diagrams illustrating construction for performing a printing data generation process (image processing) for two-pass printing of a first embodiment of the present invention.
Figure 4B:
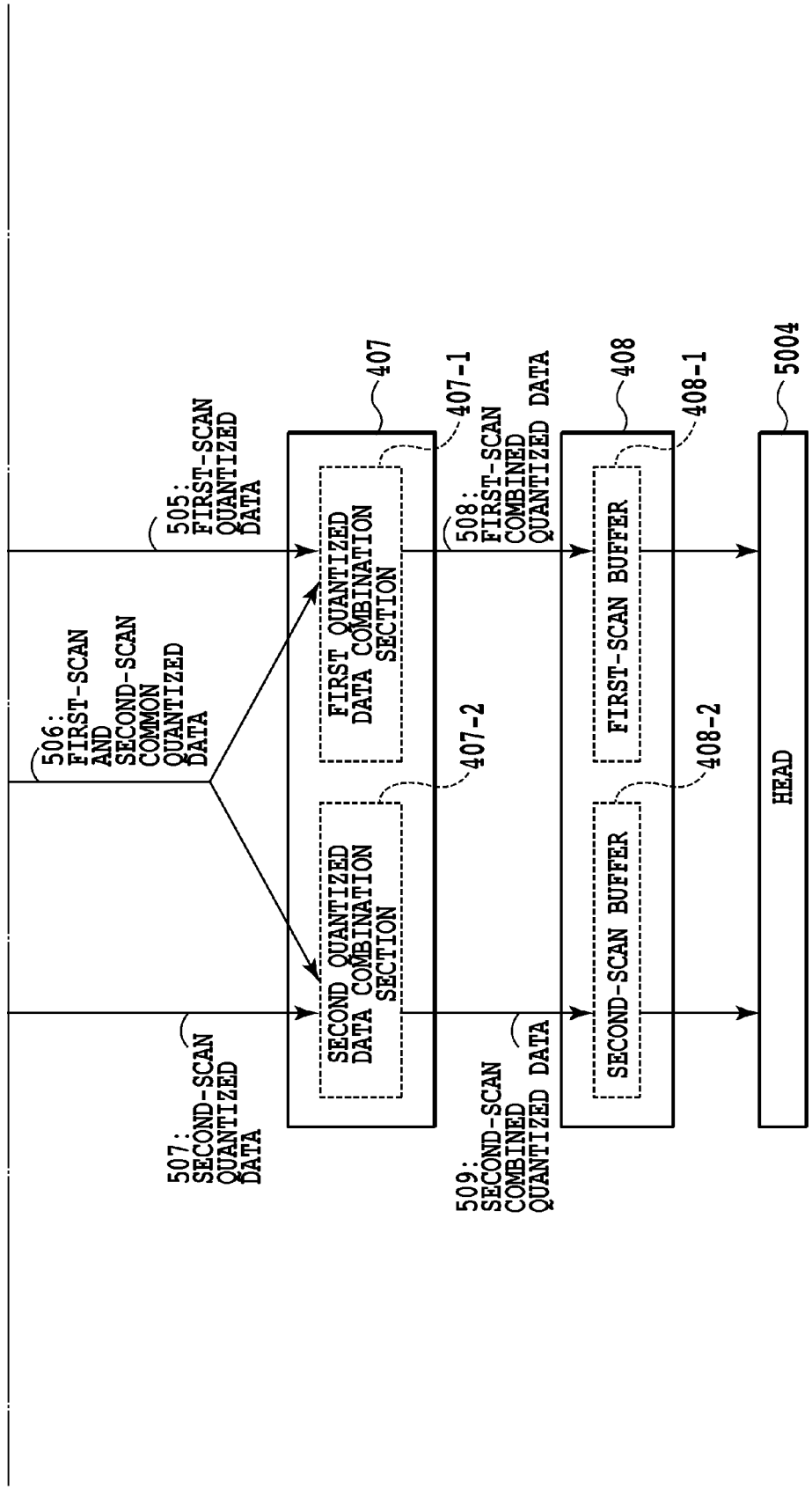

FIGS. 4A and 4B are block diagrams showing a system for performing a process (image processing) for generating printing data for the two-pass printing, according to this embodiment. The multi-valued image data input section 401, color conversion processing section 402, color separation processing section 403, gradation correction processing section 404, image characteristics detection section 409, division ratio determination section 410, image data division section 405, quantization sections 406, quantized data combination section 407 and print buffers 408, which are shown in FIGS. 4A and 4B, are formed by the control unit 3000 shown in FIG. 3. A process flow from the input of RGB input image data to the generation of binary data for two passes will be explained below with reference to FIGS. 4A and 4B. It should be noted that the processing of this embodiment that is shown in FIGS. 4A and 4B is performed on all of the printing positions on a printing medium while the printing medium is conveyed.

In FIGS. 4A and 4B, the multi-valued image data input section 401 receives an input of RGB image data that was obtained from an external device such as a digital camera 3012 or PC 3010. The color conversion processing section 402 converts this RGB image data to devise RGB image data that depends on the color reproduction range of the printer. The color separation processing section 403 converts the device RGB image data to multi-valued (in this example, 256 values) image data that corresponds to the ink colors used in the printer. The printer of this embodiment uses the four colors of ink of cyan (C), magenta (M), yellow (Y) and black (K). Therefore, the device RGB image data (R'G'B') is converted to multi-valued data (C1, M1, Y1, K1) that corresponds to C, M, Y and K inks. The color separation processing section 403 uses a three-dimensional look-up-table (LUT) that defines a relation between each of the input values (R'G'B' input values) of the device RGB image data and each of the output values (C1, M1, Y1, K1) of the multi-valued image data that corresponds to the ink colors. Here, input values that are outside the table grid values are calculated by interpolation for output values of the surrounding table grid points.

Next, the gradation correction processing section 404 performs gradation correction processing. The multi-valued data CMYK for each ink color that was generated by the color separation processing section 403 is input to the gradation correction processing section 404. The gradation correction processing section 404 performs gradation correction on the multi-valued data C1, M1, Y1, K1 and generates gradation corrected multi-valued data C2, M2, Y2, K2.

The duty detection section 409 detects the gradation values (duty) for each of the multi-valued data C2, M2, Y2 and K2. In other words, the duty detection (gradation value detection) section 409 obtains the gradation value, which is the pixel value, for each pixel subjected to the process. In addition, the division ratio determining section 410 determines the division ratios based on the detected gradation values as will be described later with reference to FIGS. 5A to 5D.

FIGS. 5A to 5D are graphs illustrating tables that are referenced when determining the division ratios. As will be described later, this embodiment generates, first-scan multi-valued data, second-scan multi-valued data and first-scan and second-scan common multi-valued data. When generating these data, percentages for dividing multi-valued data (division ratios) are determined based on gradation values (duty) of the multi-valued data from the gradation correction processing section 404, in order to generate each of the above multi-valued data.

Figure 5A:
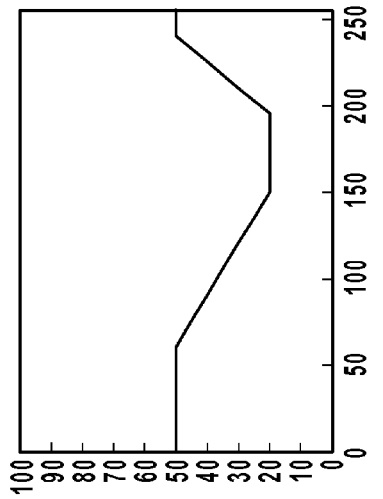
FIGS. 5A to 5D are graphs explaining tables which are referred when determining division ratios according to the first embodiment.
Figure 5B:
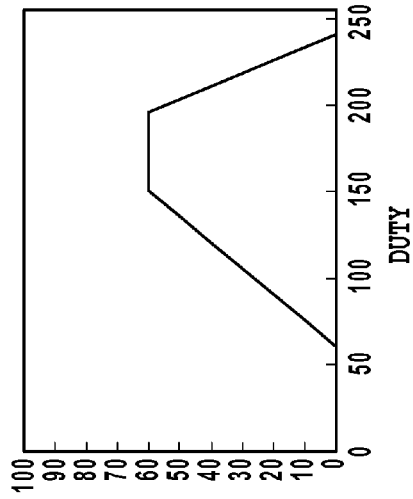
Figure 5C:
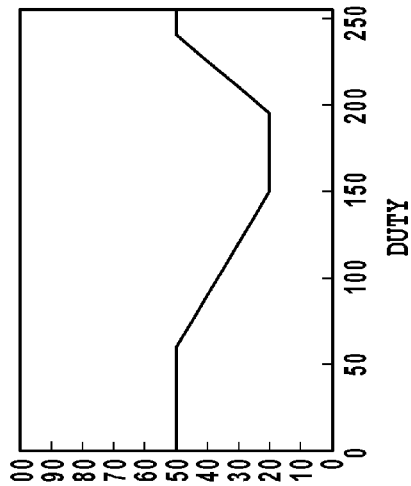

A method of determining a division ratio table of this embodiment that is illustrated in FIGS. 5A to 5C will first be explained for gradation values of the multi-valued image data described above for K ink by way of example. For example, respective images are printed with the multi-valued image data for K ink having gradation values K2=15, K2=60, K2=120, K2=150, K2=195 and K2=255 from among the gradation values 0 to 255. When doing this, by setting the division ratios as will be explained later in order to divide the multi-valued image data into first-scan multi-valued data (502), second-scan multi-valued data (503) and first-scan and second-scan common multi-valued data (504), an image of each of the aforementioned gradation values is printed for the cases when the amount of dot overlap in the first scan and second scan are 100%, 80%, 60%, 40%, 20% and 0%.

In these printed images, when sudden conveyance error (for example, 20 μm) occurs due to impact of the trailing end of the printing medium when released from the nip portion between the conveying roller and pinch roller, a difference in lightness of the printing area before and after the conveyance error occurred is found. Then, the adequate division ratios are found by evaluating the graininess in the printing area after this lightness difference and error occurred.

More specifically, for the duty of K2=15 and K2=60, the density unevenness (lightness difference) and graininess are within the allowable range when the amount of dot overlap is 0%. Moreover, for the duty of K2=120, the density unevenness and graininess are within the allowable range when the amount of dot overlap is 0% and 40%; however, especially in the case when the dot overlap amount is 40%, the lightness difference is comparatively small and the effect of reducing density unevenness is large. Furthermore, for the duty of K2=150, the allowable range is when the amount of dot overlaps 60%. For the duty of K2=195, the allowable range is when the amount of dot overlap is 0%, 40% and 60%; however, particularly in the case of 60%, the lightness difference is small. For the duty of K2=255, the density unevenness and graininess are within the allowable range regardless of the amount of dot overlap; however, from the aspect of graininess, it is preferred that the amount of dot overlap be 0%.

Figure 5D:
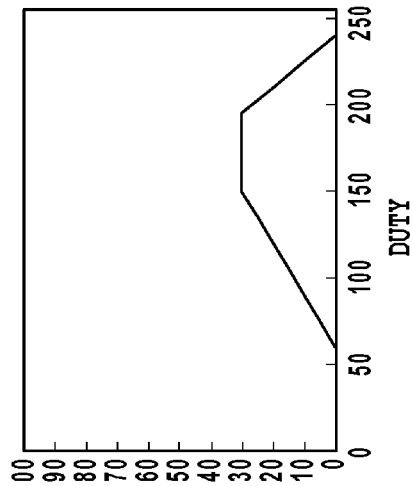

As described above it is possible to find the tables of division ratios illustrated in FIGS. 5A to 5C. FIGS. 5A, 5B and 5C are diagrams illustrating tables that determine division ratios for each duty in order to divide the multi-valued image data for K ink and generate first-scan multi-valued data, second-scan multi-valued data and first-scan and second-scan common multi-valued data. Moreover, FIG. 5D is similarly a diagram illustrating for each duty the amount of dot overlap that is obtained from the first-scan and second-scan common data illustrated in FIG. 5C.

The division ratio determining section 410 references each of the tables illustrated in FIGS. 5A, 5B and 5C for each pixel based on the duty (gradation value) of the multi-valued data of the pixel, and determines division ratios for the multi-valued data of the pixel. For example, from FIGS. 5A, 5B and 5C, the division ratios for the first-scan multi-valued data, second-scan multi-valued data and first-scan and second-scan common multi-valued data are 50%, 50% and 0% at a gradation value K2=15; 50%, 50% and 0% at K2=60; 30%, 30% and 20% at K2=120; 20%, 20% and 30% at K2=150; 20%, 20% and 30% at K2=195; and 50%, 50% and 0% at K2=255, and in this case, the amounts of dot overlap are 0%, 0%, 40%, 60%, 60% and 0%, respectively.

In this way, with this embodiment, the division ratios for generating first-scan and second-scan common multi-valued data differ according to the duty of the multi-valued image data, and thus it becomes possible to adequately reduce density unevenness and graininess in accordance with the gradation value (duty) of the image data.

The explanation above is for the division of multi-valued image data for K ink; however, by performing the same evaluation described above for other ink colors (types), it is possible to determine the division ratios according to the duty.

In the embodiment described above, the table illustrated in FIGS. 5A to 5C is used; however, any form is possible as long as construction is such that suitable division ratios are determined according to the duty. Moreover, in the embodiment above, an example is explained in which the duty is determined for each pixel; however, it is also possible to use a plurality of pixels and determine the duty for the plurality of pixels. As examples of detecting the duty (gradation value) for a plurality of pixels are the average gradation value, middle value, most frequent value, maximum value, minimum value and the like of a plurality of pixels.

In the example explained above, especially in the case of high duty such as K2=255, or in the case of low duty such as K2=15, the division ratio of the first-scan and second-scan common multi-valued data is 0%, and in the case of intermediate duty such as K2=150, the image quality becomes better when the division ratio for the first-scan and second-scan common multi-valued data is not 0% and dot overlap is allowed to occur. In this way, in FIG. 5C, when the duty (first duty) is equal to or less than a first threshold value of approximately 60 (equal to or less than a first threshold value), or when the duty (second duty) is equal to or greater than a second threshold value of approximately 240 (equal to or greater than a second threshold value), the division ratios for each ink color are determined in order that the percentage of the value of the first-scan and second-scan common multi-valued data with respect to the gradation corrected multi-valued data becomes less than when the duty (third duty) is between the first threshold value of approximately 60 and second threshold value of approximately 240. Of course, these threshold values are set for each ink color based on the evaluation described above.

Referring to FIGS. 4A and 4B, the image data division section 405 divides the gradation corrected multi-valued data C2, M2, Y2, K2 into first-scan multi-valued data 502 that corresponds only to the first scan, second-scan multi-valued data 504 that corresponds only to the second scan, and first-scan and second-scan common multi-valued data 503 that is common to both the first scan and second scan. Then, the first-scan multi-valued data 502, first-scan and second-scan common multi-valued data 503 and second-scan multi-valued data 504 are input to the quantization section 406.

The quantization section 406 performs quantization processing (in this embodiment, binarization processing) for the first-scan multi-valued data 502, first-scan and second-scan common multi-valued data 503 and second-scan multi-valued data 504. Thereby, the first-scan multi-valued data 502 becomes first-scan quantized data 505, first-scan and second-scan common multi-valued data 503 becomes first-scan and second-scan common quantized data 506, and second-scan multi-valued data 504 becomes second-scan quantized data 507.

In this embodiment, binarization processing employing an exclusive error-diffusion method is executed as the quantization processing. Though the exclusive error-diffusion method will be described in detail later, in short it is a process as follows. The error-diffusion processing is performed for the first-scan multi-valued data, the first-scan and second-scan common multi-valued data and the second-scan multi-valued data so that the printing pixels (pixels where dots will be printed) that are set based on the first through third quantized data (first-scan quantized data as the first quantized data, second-scan quantized data as the second quantized data, and first-scan and second-scan common quantized data as the third quantized data) that correspond to three planes become mutually exclusive. That is, the quantization results are controlled so that positions of the printing pixels that are set based on the first-scan quantized data 505, the printing pixel positions that are set based on the first-scan and second-scan common quantized data 506 and the printing pixel positions that are set based on the second-scan quantized data 507 do not overlap each other on the printing medium. Thereby, it is possible to control the amount of printing pixels that are set based on the first-scan and second-scan common quantized data, or in other words, it is possible to control the amount of pixels for which dots will be printed by both the first scan and second scan.

The first-scan quantized data 505, first-scan and second-scan common quantized data 506 and second-scan quantized data 507 that were generated by the quantization section 406 are input to the quantized data combination section 407. More specifically, the first-scan quantized data 505 and first-scan and second-scan common quantized data 506 are input to a first quantized data combination section 407-1, and the second-scan quantized data 507 and first-scan and second-scan common quantized data 506 are input to a second quantized data combination section 407-2. By performing a combination process (in this example, logical sum) for the first-scan quantized data 505 and first-scan and second-scan common quantized data 506, the first quantized data combination section 407-1 generates first-scan combined quantized data 508. On the other hand, by performing a combination process (in this example, logical sum) on the second-scan quantized data 507 and first-scan and second-scan common quantized data 506, the second quantized data combination section 407-2 generates second-scan combined quantized data 509.

The first-scan combined quantized data 508 and second-scan combined quantized data 509 that were generated by the quantized data combination section 407 are transferred to a print buffer 408. Then, the first-scan combined quantized data 508 is stored in a first-scan buffer 408-1, and the second-scan combined quantized data 509 is stored in a second-scan buffer 408-2.

The first-scan combined quantized data that is stored in the first-scan buffer is read when a first scan is performed and transferred to the printing head 5004, and dot printing based on the first-scan combined quantized data is executed during the first scan. Similarly, the second-scan combined quantized data that is stored in the second-scan buffer is read when a second scan is performed and transferred to the printing head 5004, and dot printing based on the second-scan combined quantized data is executed during the second scan. Thereby, printing the image to be printed in the same area is completed by two scans.

Figure 6:
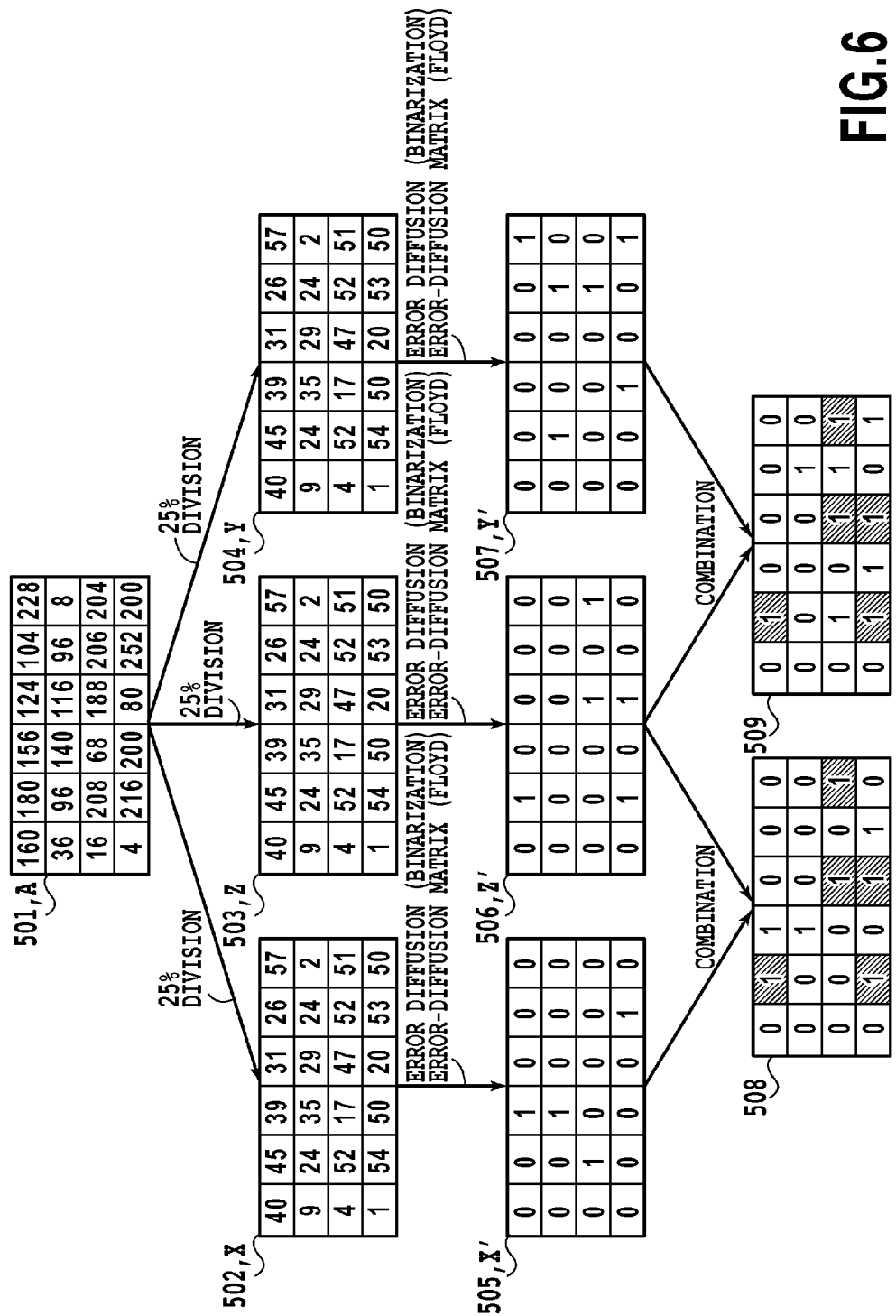
FIG. 6 is a diagram schematically expressing the image processing illustrated in FIGS. 4A and 4B (image data division process→quantization process→quantized data combination process)

Next, the image data division process (405), quantization process (406) and quantized data combination process (407) described above will be explained in detail with reference to FIG. 6 that shows the change of each of the data values. FIG. 6 is a diagram illustrating the change in data values during image processing (image data division process→quantization process→quantized data combination process). Here, the case of processing multi-valued image data 501 that corresponds to a total of 24 pixels, 4 pixels (sub scanning direction)×6 pixels (main scanning direction) will be explained. This multi-valued image data 501 corresponds to multi-valued data K2 of the gradation correction multi-valued data C2, M2, Y2, K2 that is input to the image data division section 405 in FIGS. 4A and 4B.

First, the image data division section 405 divides the multi-valued image data 501 into three divisions for each pixel to generate first-scan multi-valued data 502, second-scan multi-valued data 504 and first-scan and second-scan common multi-valued data 503. In this division, when making the value of the multi-valued image data 501 be A, the value of the first-scan multi-valued data 502 be X, the value of the second-scan multi-valued data 504 be Y and the value of the first-scan and second-scan common multi-valued data 503 be Z, division processing is performed so that X+Y+2Z=A is satisfied and that X and Y are nearly the same value. In order to do this, in this embodiment, division processing is performed so that the XYZ values become approximately ¼ (25%) the value of the multi-valued image data A. More specifically, the quotient α and remainder β (0 to 3) when dividing A by 4 are found, and XYZ values are set based on the quotient α and remainder β as below.

When β=0→X=Y=Z=α
When β=1→X−1=Y=Z=α
When β=2→X−1=Y−1=Z=α
When β=3→X−1=Y=Z−1=α

The values for X, Y and Z that are set in this way respectively become the value of the first-scan multi-valued data 502, the value of the second-scan multi-valued data 504 and the value of the first-scan and second-scan common multi-valued data 503 shown in FIG. 6, respectively. For example, when the value of multi-valued image data A is "160", α=40 and β=0, so X=Y=Z=α=40. It should be noted that the multi-valued image data 501 is 256-value data, and the value of A is any of values 0 to 255.

Next, the quantization section 406 performs exclusive error-diffusion processing for the first-scan multi-valued data 502, the first-scan and second-scan common multi-valued data 503 and the second-scan multi-valued data 504. The threshold value that is used in the error diffusion processing is "128". In addition, the Floyd error-diffusion matrix shown in FIG. 7A is used as the error-distribution matrix that gives error-distribution coefficients for the peripheral pixels when performing error-diffusion processing. The first-scan quantized data 505 is binary data that is obtained by quantizing the first-scan multi-valued data 502, where a "1" denotes a pixel where a dot is printed, and "0" denotes a pixel where a dot is not printed. Similarly, first-scan and second-scan common quantized data 506 is binary data that is obtained by quantizing the first-scan and second-scan common multi-valued data 503, and second-scan quantized data 507 is binary data that is obtained by quantizing the second-scan multi-valued data 504. As is clear from FIG. 6, the positions of the printing pixels that are defined by these binary quantized data 505 to 507 are such that they do not overlap each other. In this manner, in this embodiment, error-diffusion processing is performed for the multi-valued data 502 to 504 of the three planes so that the positions of the printing pixels that are defined by the binary quantized data 505 to 507 are each exclusive. The exclusive error-diffusion processing will be explained below with reference to FIG. 8.

Figure 8:
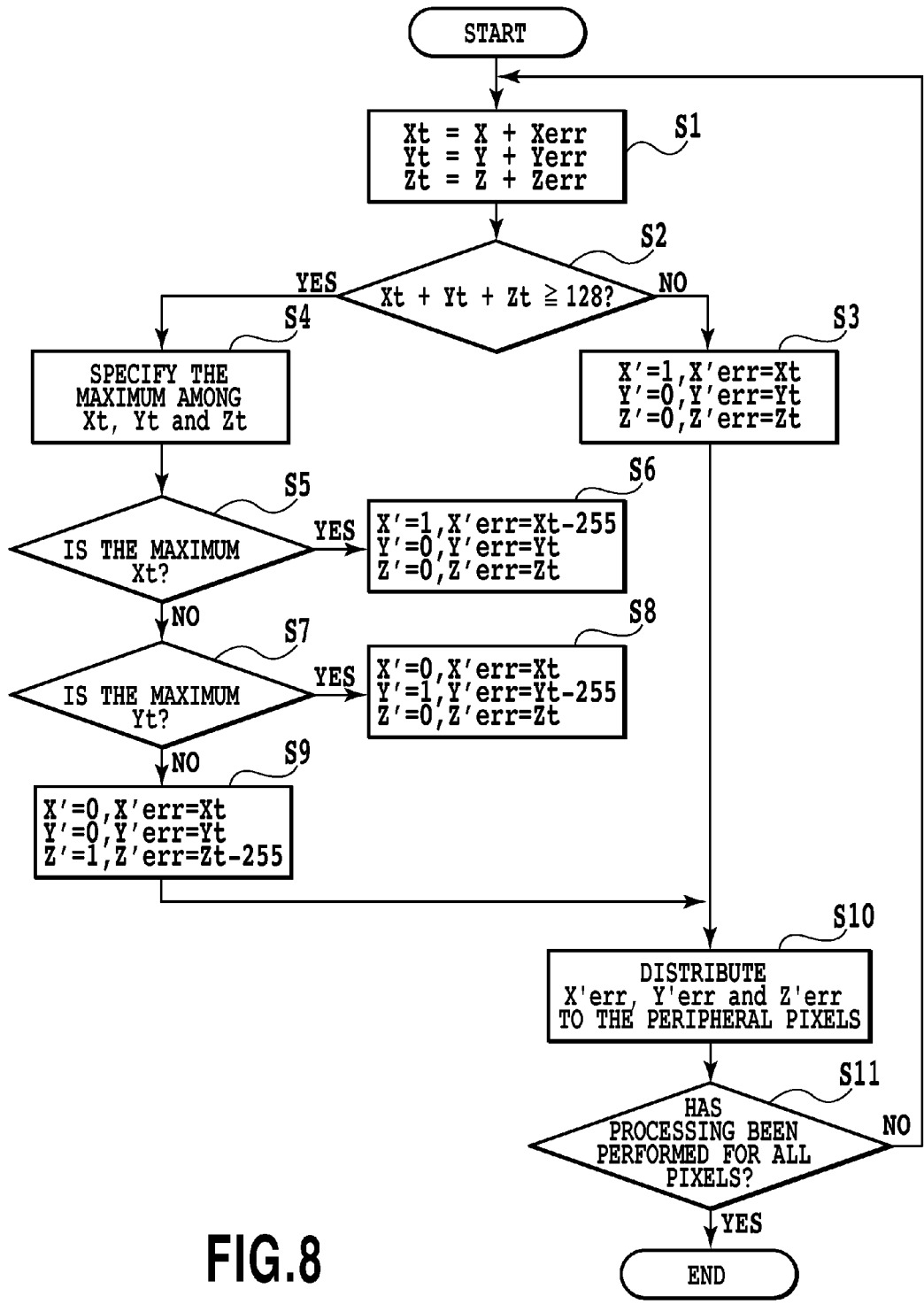
FIG. 8 is a flowchart illustrating the exclusive error-diffusion process for generating binary data in a first embodiment.

FIG. 8 is a flowchart for explaining the exclusive error-diffusion processing. First, the reference symbols in the figure will be explained. The symbols X, Y and Z, as explained above, denote values of multi-valued data (502, 504, 503) for three planes that are input to the quantization section 406 and have a value between 0 and 255. Symbols Xerr, Yerr and Zerr denote accumulated error values that are generated from peripheral pixels for which quantization (binarization) has already been completed. In this example, in order to conserve the errors generated by quantization processing for each plane, the error of the quantization process generated for each plane is distributed to peripheral pixels within the respective plane. Symbols Xt, Yt and Zt denote total values of the multi-valued data values (X, Y, Z) and the accumulated error values (Xerr, Yerr, Zerr). Symbols X', Y' and Z' denote the values of quantized data (505, 507, 506) which are the results of quantization processing (binarization). Symbols X'err, Y'err and Z'err denote error values that occur in the quantization for an object pixel.

When this processing begins, first, in step S1, the values Xt, Yt and Zt are calculated for the object pixel. Then, in step S2, the values Xt, Yt and Zt are added to each other and it is determined whether or not the added value (Xt+Yt+Zt) is equal to or greater than the threshold value (128). When the added value is determined to be less than the threshold value, processing advances to step S3, and in order that no printing is performed for the object pixel by any scan, the binarization results X', Y' and Z' are set to X'=Y'=Z'=0. In addition, the errors generated by this binarization process are conserved as X'err=Xt, Y'err=Yt and Z'err=Zt, after which processing advances to step S10.

On the other hand, in step S2, when it is determined that the added value is equal to or greater than the threshold value, processing advances to step S4, and in order to determine the plane for setting the object pixel as a printing pixel, one maximum value parameter is specified among the values Xt, Yt and Zt. However, when there are two or more maximum value parameters, one parameter is specified with the order of priority being the order Zt, Xt and Yt. The order of priority is not limited to this, and Xt or Yt could also be set as being the first priority.

Next, in step S5, it is determined whether or not the parameter specified in step S4 is Xt. When it is determined that the specified parameter is Xt, processing advances to step S6, and in order that the object pixel is printed during only the first scan, the binarization results X', Y' and Z' are set as X'=1, Y'=0 and Z'=0. Moreover, the errors that are generated by this binarization processing are conserved as X'err=Xt−255, Y'err=Yt and Z'err=Zt, after which processing advances to step S10. On the other hand, in step S5, when it is determined that the specified parameter is not Xt, processing advances to step S7, and it is determined whether or not the parameter specified in step S4 is Yt. When it is determined that the specified parameter is Yt, processing advances to step S8, and in order that the object pixel is printed in only the second scan, the binarization results X', Y' and Z' are set to X'=0, Y'=1 and Z'=0. Moreover, the errors generated by this binarization processing are conserved as X'err=Xt, Y'err=Yt−255 and Z'err=Zt, after which processing advances to step S10. In step S7, when it is determined that the specified parameter is not Yt, processing advances to step S9, and in order that the object pixel is printed in both the first scan and second scan, the binarization results X', Y' and Z' are set to X'=0, Y'=0 and Z'=1. Moreover, the errors that are generated by this binarization processing are conserved as X'err=Xt, Y'err=Yt and Z'err=Zt−255, after which processing advances to step S10.

In step S10, X'err, Y'err and Z'err that were conserved in step S3, S6, S8 or S9 are distributed to the peripheral pixels in the respective plane according to the error-distribution matrix in FIG. 7A. The quantization processing of the object pixel is completed in this manner, and processing advances to step S11. In step S11, it is determined whether or not quantization processing has been completed for all of the pixels, and when processing has not been completed for all pixels, processing returns to step S1, and the similar processing as described above is performed for the next object pixel. When processing has been completed for all pixels, the exclusive error-diffusion process ends. The accumulated error values (for example, Xerr) that are used in step S1 are accumulated values of the quantization errors (for example, X'err) that are distributed from one or a plurality of pixels in step S10.

Through the exclusive error-diffusion processing described above, quantized data (first-scan quantized data 505 (X'), first-scan and second-scan common quantized data 506 (Z') and second-scan quantized data 507 (Y')) are generated as illustrated in FIG. 6 so that the positions of printing pixels do not overlap each other. In other words, it is possible to control the amount of "1s" (printing dots) in the first-scan and second-scan common quantized data that is generated exclusively from other data, through the division ratio described above. Thereby, as will be described next, it becomes possible to control the amount of overlapping dots that will be printed according to the quantized data for the first scan and second scan that are finally generated by combining the common data.

FIG. 6 will be referenced again. The first quantized data combination section 407-1 combines the first-scan quantized data 505 and first-scan and second-scan common quantized data 506 using a combination process (in this embodiment, logical sum) to generate binary first-scan combined quantized data 508. In this first-scan combined quantized data 508, pixels to which a "1" is attached are pixels that become the object of printing in the first scan, and pixels to which a "0" is attached are pixels that do not become the object of printing in the first scan. Further, pixels denoted by diagonal lines are pixels that become the object of printing in both the first scan and second scan. Similarly, the second quantized data combination section 407-2 combines the second-scan quantized data 507 and first-scan and second-scan common quantized data 506 using a combination process (in this embodiment, logical sum) to generate binary second-scan combined quantized data 509. In this second-scan combined quantized data 509, pixels to which a "1" is attached are pixels that become the object of printing in the second scan, and pixels to which a "0" is attached are pixels that do not become the object of printing in the second scan. In addition, pixels denoted by diagonal lines are pixels that become the object of printing in both the first scan and second scan in common with each other.

With this embodiment, as described above, it is possible to generate pixels for which dots will be printed commonly in a plurality of scans, and therefore it is possible to suppress fluctuation of the dot coverage (image density fluctuation) that is caused by conveyance error of the printing medium, movement error of the carriage or the like. Moreover, by quantizing multi-valued data that corresponds in common with a plurality of scan, it is possible to control the amount of pixels for which dots are printed in each of the plurality of scans (overlapping dots), and thus it is possible to suppress graininess due to an excessive amount of overlapping dots from becoming worse. Thereby, it is possible to keep graininess low level while at the same time suppress density fluctuation in an image.

Furthermore, with this embodiment, the division ratios used when dividing the multi-valued data and generating multi-valued data for each scan and multi-valued data that is common to each scan are made to be different according to the gradation value (duty) of the image data, so that it is possible to adequately reduce density unevenness or graininess according to the duty of the image data.

Figure 13A:
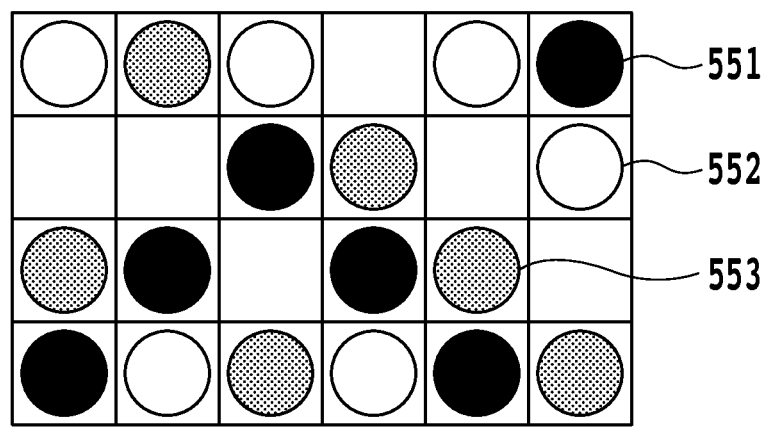
FIGS. 13A and 13B are diagrams illustrating the dot arrangement of dots printed in two scans.
Figure 13B:
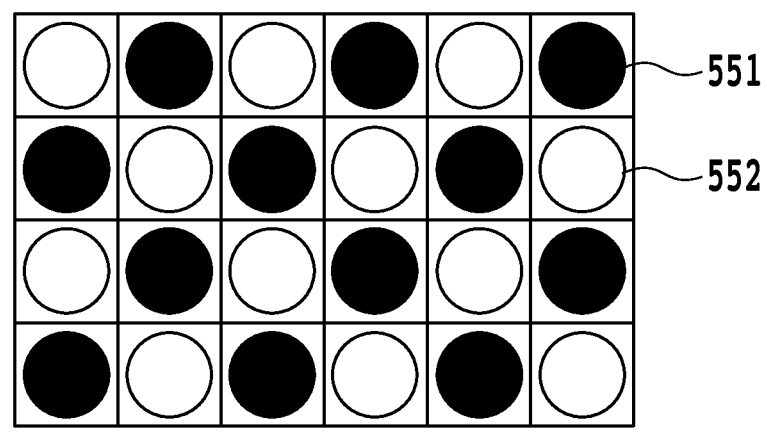

It should be noted that in this embodiment, division processing is performed so that the relationship X+Y+2Z=A is satisfied and such that X, Y and Z are nearly the same value to each other. However, the invention is not limited to this condition. In this embodiment, X, Y and Z are determined according to division ratios determined by the division ratio determination section 410. By satisfying the relationship X+Y+2Z=A, the values of the multi-valued data before and after division do not change, and therefore the density conservation of the image is very excellent. However, even though the relationship X+Y+2Z=A is not satisfied, as long as the value of X+Y+2Z is roughly A, it is possible to sufficiently maintain conservation of the image density. In addition, when executing the processing of this embodiment, pixels occur as illustrated in FIG. 13A for which dots are not printed even though the value of the multi-valued image data 501 is a value that indicates the maximum density value (255). In the case of dot arrangement as illustrated in FIG. 13A, the image density becomes low when compared with the dot arrangement of a 100% solid image as illustrated in FIG. 13B. The image density for a dot arrangement as illustrated in FIG. 13A is sufficient. However, when it is desired to express a higher density, it is possible to set the values of X, Y and Z so that the total value X+Y+2Z is a value equal to or greater than A.

(Second Embodiment)

A second embodiment of the present invention is related to a mode of determining whether or not to execute the image data division process of the first embodiment illustrated in FIGS. 4A and 4B, in accordance with the gradation value (duty) of the image data.

For the pass division that is explained in the first embodiment, there is a tendency for the processing load and the amount of memory used to increase when compared with conventional quantization and subsequent division of data into scans by using masks. The reason for the increase in processing load is the division of data into first-scan multi-valued data, second-scan multi-valued data, and first-scan and second-scan common multi-valued data (first division process). Moreover, other reason for the increase in processing load is the quantization of each of the three divided data (second quantization process) and the combination process of the lowered gradation results for the first-scan and second-scan common multi-valued data with the lowered gradation results for the first scan and second scan (combination process). Furthermore, when using error-diffusion for the quantization process, there is the input and output of error data for lowering gradation for the first scan, second scan and common first scan and second scan. In addition, as the reason for the increase in the amount of memory used is that the amount of error data for lowering gradation for the first scan, second scan and common first scan and second scan that is stored becomes three times that when pass division is not performed and the number of bits of the error are made the same. Particularly, when compared with a personal computer, the CPU of the printer is slow and the printer tends to have small memory capacity. Therefore, using the printer to perform quantization leads to an increase in cost in order to improve processing performance and an increase the amount of memory.

Here, as described above, in the case of the second duty in which the duty is high such as K2=255, or in the case of the first duty in which the duty is low such as K2=15, it is preferred that the amount of dot overlap be 0%. Therefore, in these cases, conventional quantization followed by division using masks is performed without executing division (pass division) of the multi-valued image data. Thereby, it is possible to reduce the processing load without changing the image quality, and it is possible to reduce the amount of memory required when compared with executing processing for dividing the multi-valued data. Moreover, in the case of relatively high conveyance precision and little dot displacement, by making the amount of dot overlap 0% for an image with low duty, it is possible to suppress the occurrence of graininess feeling while maintaining a complimentary relationship between the dots of an image with low gradation. In the case of multi-valued image data of other colors, at gradation values (duty) where it is preferable that the amount of dot overlap is 0%, it is similarly possible to not execute division of the multi-valued image data.

Figure 9:
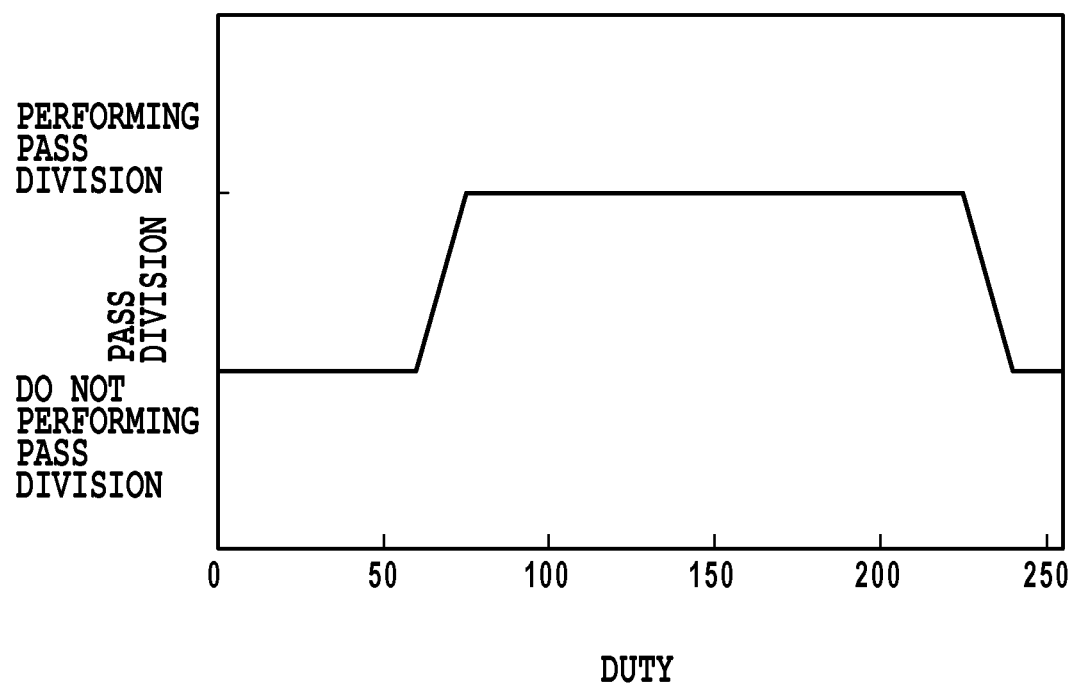
FIG. 9 is a graph explaining a table which is referred when determining whether or not to performing pass division, according to the second embodiment.
Figure 10B:
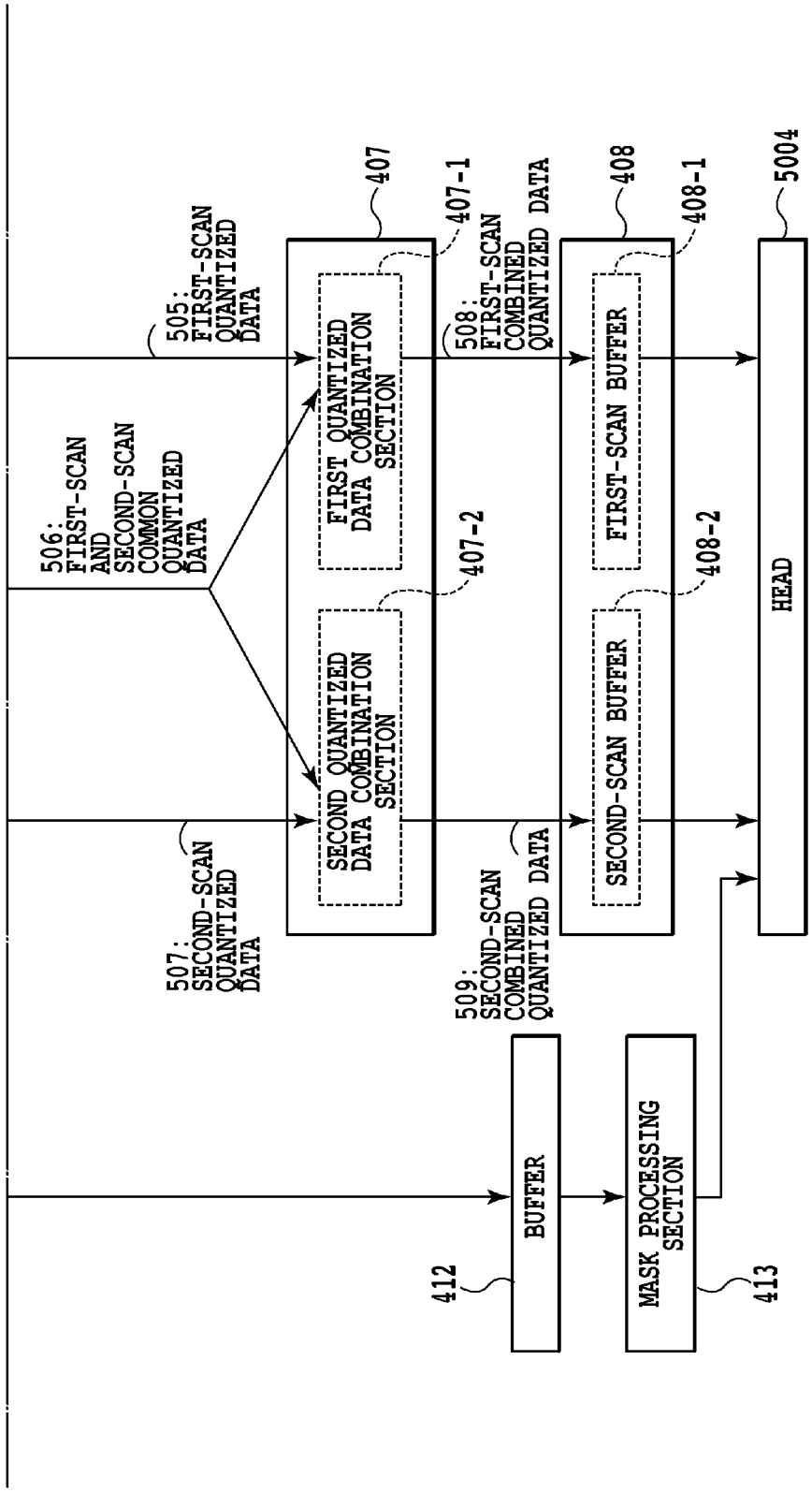
FIG. 10 is a diagram showing a relationship between FIG. 10A and FIG. 10B, and FIGS. 10A and 10B are block diagrams illustrating construction for performing a printing data generation process (image processing) for two-pass printing of a second embodiment of the present invention.

FIGS. 10A and 10B are block diagrams illustrating the image processing of this embodiment, and is similar drawings to FIGS. 4A and 4B that are related to the first embodiment, so the same reference numbers will be given to elements that are the same as the elements illustrated in FIGS. 4A and 4B, and an explanation of those elements will be omitted. As illustrated in FIGS. 10A and 10B, when the duty detection section 409 detects that the duty is the intermediate duty that is the third duty, then as is explained in the first embodiment, the division process (first division process) 405, quantization process (first quantization process) 406 and the combination process 407 are performed. In other words, when the duty (gradation value) of the multi-valued image data that corresponds to a pixel area is a third duty, which is a value between the first threshold value and second threshold value, the first processing mode for performing processing as in the first embodiment is selected. On the other hand, in the case that the duty detection section 409 detects the duty of the multi-image data and determines not to execute the pass division by referring to a table illustrated in FIG. 9 with the duty, gives the multi-valued image data to the quantization section 411. The quantization section 411 quantizes the received data as is (second quantization). In this embodiment, quantization is binarization, from which binary data is obtained. A well-known method such as the error-diffusion method can be used as this quantization method. In addition, this binarized data is temporarily stored in a buffer 412. Moreover, a mask processing section 413 performs a mask process on the binary data stored as this quantized data, and divides the binary data into first-scan binary data and second-scan binary data as quantized data for two-pass printing (second division process). Furthermore, this divided binary data is read according to the timing for scanning by the printing head 5004. In this way, when the duty of multi-valued image data that corresponds to a pixel area is intermediate third data, the second processing mode for performing image processing that includes the second division process and second quantization process is selected.

With the embodiment described above, it is possible to reduce the overall processing load and suppress an increase in the amount of memory required while at the same time reduce the density unevenness and graininess in a printed image.

Setting whether or not to perform pass division is not limited to the table method illustrated in FIG. 9, and any method can be used as long as setting is possible.

(Third Embodiment)

A third embodiment of the present invention, in addition to the gradation value or duty of the image data explained above, takes into consideration the printing positions on the printing medium that correspond to the conveyance of the printing medium in order to determine whether or not to divide the multi-valued image data, or in other words, whether or not to perform pass division.

An explanation of the printing positions on the printing medium as the printing medium is conveyed in this embodiment is as follows . A leading end portion of the printing medium (leading end area) is the printing position when the printing medium is conveyed in a condition that the printing medium is held between the conveying roller 5001 and pinch roller 5002 on the upstream side (upstream roller pair). Next, the boundary between that leading end portion and the middle portion (middle area) is the printing position when the leading edge of the printing medium is just inserted into the nip portion between the discharge roller 5005 and spurs 5006 on the downstream side in the conveyance of the printing medium. When the printing medium is inserted into the nip portion, the conveyance amount may suddenly become more than normal, and in that case, displacement of the printing position becomes comparatively large.

The middle portion is the printing position when the printing medium is conveyed in a condition that the printing medium is held between the both the upstream conveying roller 5001 and pinch roller 5002, and the downstream discharge roller 5005 and spurs 5006.

Furthermore, the boundary between the middle portion and the trailing end portion (trailing end area) is the printing position when the printing medium leaves the nip portion between the upstream conveying roller 5001 and pinch roller 5002. When the printing medium leaves the nip portion, as in the case of entering the nip portion described above, the conveyance amount of the printing medium may suddenly become greater than normal, and in that case, displacement of the printing position becomes comparatively large. Finally, the trailing end portion is the printing position when the printing medium is conveyed in a condition that the printing medium is held between the downstream discharge roller 5005 and the spurs 5006 (downstream roller pair).

In this embodiment, the detection of these printing positions is performed by detecting a position on the printing medium according to the amount of rotation of the conveying roller that is measured from when the leading edge of the printing medium is detected by a specified sensor that is provided in the conveying path. This amount of rotation can be known by a signal from an encoder that is located on the conveyance roller. Even in the case in which the printing medium is conveyed only by the discharge roller, the amount of rotation of the conveying roller that rotates with the discharge roller can be known. In addition, of the printing positions, the "boundary" mentioned above can be determined by the encoder to be the printing position where the amount of rotation becomes a specified amount greater than the amount of rotation during normal rotation.

At the printing positions on the printing medium described above, when the printing area moves from the leading end portion to the middle portion, a sudden conveyance error of several 10s of μm may occur due to impact occurring when the leading edge of the printing medium enters the nip position between the discharge roller and the spur roller. As a result, displacement of the printing position occurs during a plurality of scans at the printing position of the leading end portion near the boundary. Moreover, similarly, when the printing area moves from the middle portion of the printing medium to the trailing end portion, a sudden conveyance error of several 10s of μm may occur due to an impact occurring when the trailing edge of the printing medium leaves from the nip position between the conveying roller and pinch roller. In this case as well, similar density unevenness occurs at the printing position of the trailing end portion near the boundary. Conveyance error may occur when the printing position is the middle portion (the area that is completed by a plurality of scans immediately after the leading edge of the printing medium has entered and immediately after the trailing edge is released is not included in the middle portion). However, when compared with density unevenness near the boundary, density unevenness caused by the conveyance error in the middle portion is small. Moreover, as is explained in the second embodiment, execution of pass division increases the processing load and the amount of memory used.

Therefore, in this embodiment, whether or not to perform pass division is determined according to the duty of the image data at least one of the leading end portion of the printing medium near the boundary and the trailing end portion of the printing medium near the boundary, described above. More specifically, for multi-valued image data that corresponds to a printing position (first relative position) in which printing is completed by a plurality of scans immediately after the printing medium enters the nip portion or immediately after the printing medium leaves the nip portion, whether or not to execute pass division is determined according to the duty of that multi-valued image data. This determination is performed using a table similar to that illustrated in FIG. 9 and explained in the second embodiment. More specifically, when the duty of the multi-valued image data that corresponds to the printing positions mentioned above is high or low, pass division is not to be performed, otherwise pass division is performed. In addition, when pass division is performed, the division ratios are set using the tables illustrated in FIGS. 5A to 5C as explained for the first embodiment. On the other hand, in printing positions other than the printing positions described above, for example the middle portion (second relative position), because the displacement of the printing position between scans is small compared with when the leading edge of the printing medium enters and when the trailing edge is released, and from the aspect of reducing processing load and reducing the amount of memory used, pass division is not performed.

With the embodiment described above, when the displacement of printing position occurs between a plurality of scans due to conveyance error of the printing medium, whether or not to perform pass division as explained in the first embodiment is determined according to the duty of the image data. Thereby, unnecessary pass division is not performed, and thus it is possible to lessen the processing load and reduce the amount of memory used, as well as it is possible to decrease density unevenness and graininess.

In the example above, only the areas of the leading end portion and the trailing end portion near the boundary is the object of determination as to whether or not to execute the pass division according to the duty of the image data; however, of course the invention is not limited to this mode. For example, the leading end portion and trailing end portion of the printing medium may also be the object of the determination. Moreover, it is possible to designate these areas as the areas for determination, and not designate the middle portion as the object of determination, or not perform pass division for the middle portion. In this case as well, it is possible to obtain a certain effect of reducing the processing load and reducing the amount of memory used.

(Other Embodiments)

In each of the embodiments described above, when dividing multi-valued data, error-diffusions are performed exclusively for three multi-valued data. However, the error-diffusion does not have to be exclusive. More specifically, error-diffusion processing may be performed for the three multi-valued data using the three types of error-distribution matrices shown in FIGS. 7A to 7C.

To the quantization section 406 shown in FIG. 4A, the first-scan multi-valued data 502, first-scan and second-scan common multi-valued data 503 and second-scan multi-valued data 504 that are generated by the image data division section 405 are input. The quantization section 406 generates first-scan quantized data 505 by performing binary error-diffusion processing for the first-scan multi-valued data 502. In this generation, "128" is used as a threshold value (predetermined value), and the error-distribution matrix shown in FIG. 7B is used as the error-distribution matrix. Moreover, the quantization section 406 generates first-scan and second-scan common quantized data 506 by performing binary error-diffusion processing for the first-scan and second-scan common multi-valued data 503. In this generation, "128" is used as a threshold value, and the error-distribution matrix shown in FIG. 7A is used as the error-distribution matrix. Furthermore, the quantization section 406 generates second-scan quantized data 507 by performing binary error-diffusion processing for the second-scan multi-valued data 504. In this generation, "128" is used as a threshold value, and the error-distribution matrix shown in FIG. 7C is used as the error-distribution matrix.

By using different error-distribution matrices among three planes in this manner, the quantization results for the three planes (positions of printing pixels that are set by the quantized data 505 to 507) can be made different. Thereby, pixels to be printed only by the first scan and pixels to be printed only by the second scan can be generated while pixels (overlapping dots) to be printed by both the first scan and second scan are generated. If the same error-distribution matrix is used among three planes, the quantization results for the three planes are very similar. In that case, the pixels that are printed by the first scan and the pixels that are printed by the second scan are nearly the same, and even when printing an image with the maximum density, of almost all of the printing pixels half are overlapping dots, and for the other half of the pixels, blank pixels where no dots are printed increase. In such a case, it is difficult to conserve the input values in the density of the output image. However, in this embodiment, the quantization results for the three planes differ, and not only the pixels that are printed by both the first scan and second scan, but also the pixels that are printed only in the first scan and the pixels that are printed only in the second scan are generated. Therefore, it is possible to maintain the output image density to a certain extent.

In addition, the respective positions of the printing pixels (pixels to which "1" is assigned) defined by the binary quantized data 505 to 507 that are generated by the processing of this embodiment are not in a perfectly exclusive relationship with each other. Accordingly, there is a possibility that the respective positions of printing pixels will overlap. For example, there may be cases in which the binarization result for a certain pixel is "1" for both the quantized data 505 and quantized data 506. Therefore, by applying a logical sum process as the combination process after that as in the first embodiment, the number of printing pixels after the combination process becomes less than the number of printing pixels that is defined by the quantized data 505 to 507. In that case, the ability to conserve the input values in the density of the output image decreases. When this decrease in the density can be allowed, the logical sum process can be applied as the combination process. However, when such a decrease in density cannot be allowed, a combination process can be executed in which the values of the quantized data ("1" or "0") are added for each pixel, such that the added value becomes the value of the combined quantized data. For example, for a certain pixel A, when the value of both the quantized data 505 and the quantized data 506 is "1", the value of the first-scan combined quantized data 508 is taken to be 2 (=1+1). Then the number of dots that corresponds to the added value (0, 1, 2) is printed in each scan. Thereby, printing can be performed without a decrease in the preservation of the input values in the density of the output image.

With the embodiment described above, as explained in the first embodiment, it is possible to control the amount of pixels (overlapping dots) that are printed in both the first scan and second scan, so that it is possible to suppress both image density fluctuation and a worsening of graininess as described above. In addition, with this embodiment, error-diffusion processing is performed independently for three planes, so when compared with performing exclusive error-diffusion processing as in the first embodiment, it is possible to improve the processing speed.

In this embodiment, in order to make the quantization results for three planes different, the case is explained in which the error-distribution matrices that are used for the planes are different. However, the embodiment is not limited to this. For example, instead of the above configuration, the error-distribution matrices that are used among the planes may be the same, and the threshold values that are used for the planes may be different. Moreover, it is possible to make a combination of error-distribution matrices and threshold values different for the planes.

Furthermore, as another embodiment, instead of the quantization section 406 performing quantization by the error-diffusion method as in the first and second embodiments, it may be possible for the quantization section 406 to perform quantization by using a dither method.

In this case, to the quantization section 406 shown in FIG. 4A, the first-scan multi-valued data 502, first-scan and second scan common multi-valued data 503 and second-scan multi-valued data 504 that are generated by the image data division section 405 are input. The quantization section 406 performs dither processes for the first-scan multi-valued data 502, first-scan and second scan common multi-valued data 503 and second-scan multi-valued data 504 using different dither matrices for each. By performing the dither processes (quantization processes) using three different dither matrices in this manner, it is possible to generate three different quantized data 505 to 507 as the quantization result.

With this embodiment, it is possible to suppress both image density fluctuation and the worsening of graininess while at the same time maintain to a certain extent the conservation of output image density as in the embodiments described above. In addition to this, in this embodiment, the dither process is performed independently for multi-valued data of three planes, and accordingly it is possible to further improve the processing speed. Furthermore, in this embodiment, the dither process is performed using three different dither matrices, and accordingly control of the dot arrangement in each scan and spatial frequency of the overlapping dot arrangement among scans becomes easier than in the case of performing error-diffusion processing.

In the embodiments described above, when dividing the multi-valued data, binarization processing is performed as the quantization processing. However, as yet another embodiment, three-value quantization processing may be performed as the quantization processing. Except for this point the embodiment is the same as the other embodiments described above. In this embodiment, the binarization processing in all of the embodiments described above can be replaced with three-value quantization processing. However, here the case of replacing the binarization processing of the first embodiment with three-value quantization processing will be explained. In this embodiment, three-value exclusive error-diffusion processing is performed on the multi-valued data 502 to 504 so that the positions of printing pixels that are defined by each of the quantized data 505 to 507, which are quantized to three valued data, do not overlap each other.

Figure 11B:
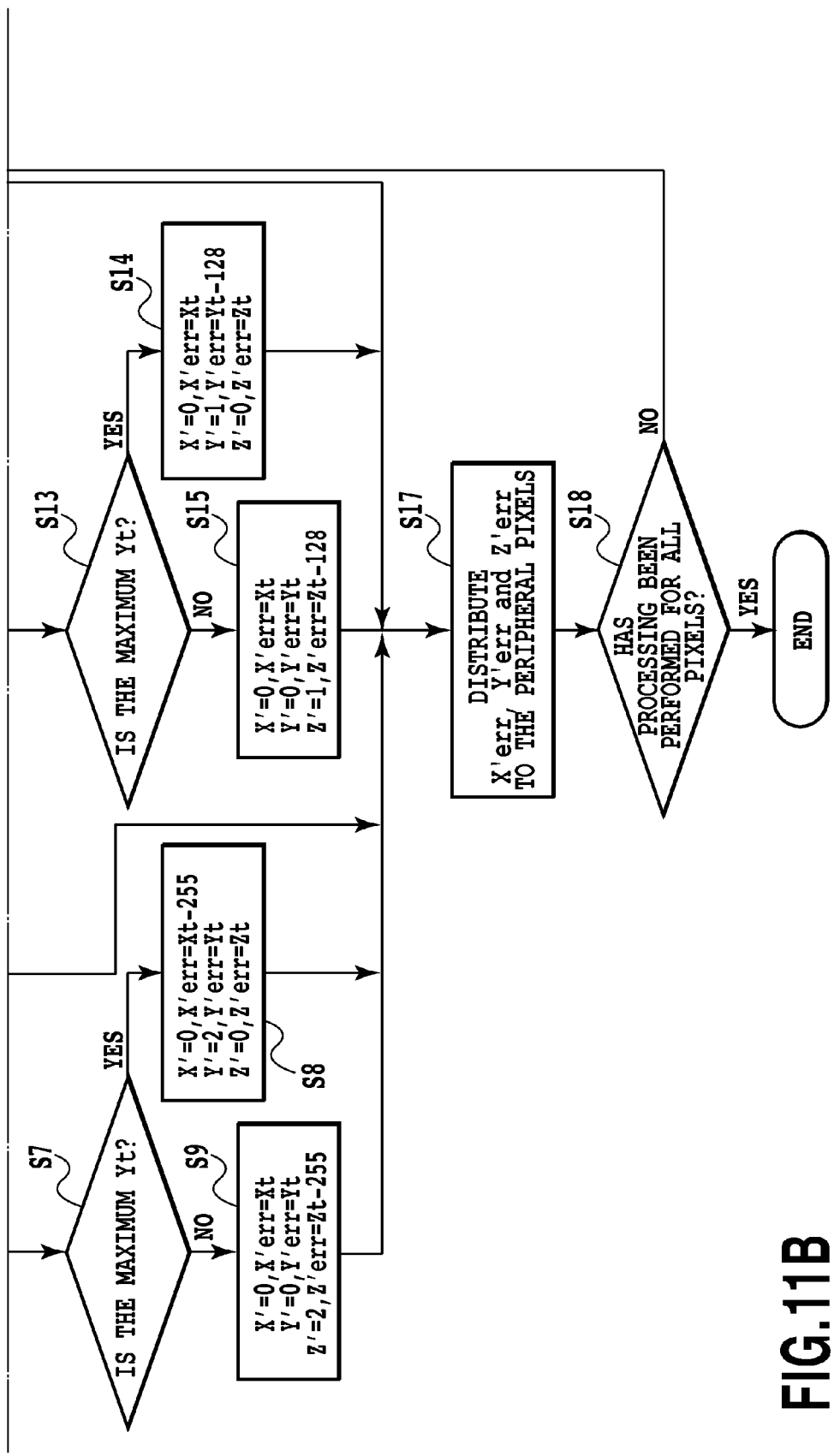
FIG. 11 is a diagram showing a relationship between FIG. 11A and FIG. 11B, and FIGS. 11A and 11B are flowcharts illustrating the exclusive error-diffusion process for generating three-value data in another embodiment of the invention.

FIGS. 11A and 11B are flowcharts for explaining the three-value exclusive error-diffusion processing. The meaning of the symbols (Xt, Xerr, X' and the like) in FIGS. 11A and 9B are the same as the meaning of the symbols in FIG. 8. In this embodiment, as threshold values, a first addition threshold value (170) and a second addition threshold value (85) are used. Moreover, the values of the three-value quantization results X', Y' and Z' are any one of "0", "1" or "2". Here, "0" indicates that no dot is printed, "1" indicates that one dot is printed, and "2" indicates that two dots are printed.

When this processing begins, first in step S1, the values Xt, Yt and Zt are calculated for the object pixel. Next, in step S2, the added value At that is obtained by adding Xt, Yt and Zt (=Xt+Yt+Zt) is obtained. Then in step S3, it is determined whether the added value At is equal to or greater than the first addition threshold value (170), whether the added value At is less than the first addition but equal to or greater than the second addition threshold value (85), and whether the added value At is less than the second addition threshold value.

In step S3, when it is determined that the added value At is less than the second threshold value (85), processing advances to step S16, and in order that the object pixel is not printed in any of the scans, the results of the three-value quantization are set to X'=Y'=Z'=0. Moreover, the errors that are generated by this three-value quantization process are saved as X'err=Xt, Y'err=Yt and Z'err=Zt, and then processing advances to step S17.

On the other hand, in step S3, when the added value At is determined to be equal to or greater than the first addition threshold value (170), processing advances to step S4, and in order to determine the plane for setting the object pixel to a printing pixel ("1"), one of the parameters having the maximum value is identified from Xt, Yt and Zt. However, when there are two or more maximum value parameters, one parameter is identified in the order of priority Zt, Xt and Yt. The order of priority is not limited to this, and Xt or Yt could be the first priority. Next, in step S5, it is determined whether or not the maximum value parameter identified in step S4 is Xt. When the parameter is determined to be Xt, processing advances to step S6, and in order that two dot are printed for the object pixel in the first scan, the three-value quantization results are set as X'=2, Y'=0 and Z'=0. Moreover, the errors that are generated by this three-value quantization process are saved as X'err=Xt−255, Y'err=Yt and Z'err=Zt, after which processing advances to step S17. On the other hand, in step S5, when it is determined that the parameter is not Xt, processing advances to step S7, and it is determined whether or not the maximum value parameter that is identified in step S4 is Yt. When it is determined that the parameter is Yt, processing advances to step S8, and in order that two dots are printed for the object pixel in the second scan, the three-value quantization results are set as X'=0, Y'=2 and Z'=0. Moreover, the errors that are generated in this three-value quantization process are saved as X'err=Xt, Y'err=Yt−255 and Z'err=Zt, after which processing advances to step S17. In step S7, when it is determined that the parameter is not Yt, processing advances to step S9, and in order that two dots are printed for the object pixel in both the first scan and second scan, the binarization results are set as X'=0, Y'=0 and Z'=2. Moreover, the errors that are generated in this binarization process are save as X'err=Xt, Y'err=Yt and Z'err=Zt−255, after which processing advances to step S17.

On the other hand, in step S3, when it is determined that the added value At is less than the first addition threshold value (170) and equal to or greater than the second addition threshold value (85), processing advances to step S10. In step S10, in order to determine the plane for setting the object pixel to the printing pixel ("2"), one maximum value parameter is identified from Xt, Yt and Zt according to the same rules as in step S4. Next, in step S11, it is determined whether or not the maximum value parameter that is identified in step S10 is Xt. When it is determined that the parameter is Xt, processing advances to step S12, and in order that one dot is printed for the object pixel in the first scan, the three-value quantization results are set to X'=1, Y'=0 and Z'=0. Moreover, the errors that are generated by this three-value quantization process are saved as X'err=Xt−128, Y'err=Yt and Z'err=Zt, after which processing advances to step S17. On the other hand, in step S11, when it is determined that the parameter is not Xt, processing advances to step S13 and it is determined whether or not the maximum parameter identified in step S10 is Yt. When it is determined that the parameter is Yt, processing advances to step S14, and in order that one dot is printed for the object pixel in the second scan, the three-value quantization results are set to X'=0, Y'=1 and Z'=0. Moreover, the errors that are generated by this three-value quantization process are saved as X'err=Xt, Y'err=Yt−128 and Z'err=Zt, after which processing advances to step S17. In step S13, when it is determined that the parameter is not Yt, processing advances to step S15, and in order that one dot each is printed for the object pixel in both the first scan and second scan, the binarization results are set to X'=0, Y'=0 and Z'=1. Moreover, the errors that are generated by this binarization processing are saved as X'err=Xt, Y'err=Yt and Z'err=Zt−128, after which processing advances to step S17.

In step S17, the errors X'err, Y'err and Z'err that are saved in step S6, S8, S9, S12, S14, S15 or S16 are distributed to the peripheral pixels of its own plane according to the error-distribution matrix shown in FIG. 7A. In this way, quantization processing of an object pixel end and processing advances to step S18. In step S18, it is determined whether or not quantization processing has ended for all of the pixels, and when processing has not yet ended for all of the pixels, processing returns to step S1 and the similar processing is performed for the next object pixel, and when processing has ended for all of the pixels, the exclusive error-diffusion processing ends. The exclusive error-diffusion processing described above allows quantized data (first-scan quantized data 505 (X'), first-scan and second-scan common quantized data 506 (Y') and second-scan quantized data 507 (Z')) to be generated for three planes, so that the positions of the printing pixels do not overlap each other.

With the embodiment described above, in addition to the effect obtained by the other embodiments, it is possible to obtain an image having even better gradation expression than the embodiments above in which binarization processing is performed. When a plurality of dots are formed in a pixel area, ink may be ejected a plurality of times toward the same position in the pixel area, or ink may be ejected a plurality of times toward different positions in the pixel area.

This embodiment is not limited to the case in which binarization processing that is explained in the first embodiment is replaced with three-value quantization processing, and it is possible to replace the binarization processing of the embodiments that use the three kinds of error-diffusion matrices described above or the embodiments that use the dither method with three-value quantization processing. When binarization is replaced with three-value quantization in this way, it is possible to execute three-value error-diffusion processing or three-value dither as the quantization process. In this case, in order to make the three-value quantization results different among planes, using different error-distribution matrices or different dither matrices for each plane is the same as in the embodiments described above. In this manner, the quantization section 406 generates three-value quantized data 505 to 507 having different quantization results. The positions of the printing pixels that are defined by these three-value quantized data do not have a completely exclusive relationship with each other, and accordingly there may be cases in which the positions of the printing pixels overlap.

Therefore, it is preferred that a combination process in which the quantized values are added for each pixel as in the embodiments described above be applied as the following combination process.

In the embodiments described above, two-pass printing in which an image to be printed in the same area is completed by two scans is explained. However, as another embodiment it is possible to apply multi-pass printing of three passes or more. In the following, as an example of multi-pass printing of three passes or more an example of the case of three-pass printing will be explained. Features of this embodiment are an image data division process, quantization process and quantized data combination process, and except for these features, processing is the same as in the embodiments described above. Only the image data division process, quantization process and quantized data combination process will be explained below with reference to FIG. 12.

FIG. 12 is a diagram schematically illustrates the flow of image processing that is executed by the image data division section 405, quantization section 406 and quantized data combination section 407 shown in FIGS. 4A and 4B (image data division process→quantization process→quantized data combination process). As is explained in the first embodiment, gradation corrected multi-valued data K2 (multi-valued image data 501) is input to the image data division section 405.

The image data division section 405 divides the input multi-valued image data into first-scan multi-valued data 901 that corresponds only to the first scan, second-scan multi-valued data 902 that corresponds only to the second scan, third-scan multi-valued data 903 that corresponds only to the third scan, first-scan and second-scan common multi-valued data 904 that corresponds to both the first scan and second scan, first-scan and third-scan common multi-valued data 905 that corresponds to both the first scan and third scan, second-scan and third-scan multi-valued data 906 that corresponds to both the second scan and third scan, and first-scan, second-scan and third-scan common multi-valued data 907 that corresponds to all of the first scan, second scan and third scan.

Next, the quantization section 406 performs binary exclusive error-diffusion as explained for the first embodiment on these seven planes of multi-valued data 901 to 907. Thereby, first-scan quantized data 911, second-scan quantized data 912, third-scan quantized data 913, first-scan and second-scan common quantized data 914, first-scan and third-scan common quantized data 915, second-scan and third-scan common quantized data 916, and first-scan, second-scan and third-scan common quantized data 917 are generated.

Next, these seven planes of quantized data 911 to 917 are input to the quantized data combination section 407 and the quantized data 911 to 917 are combined for each corresponding scan. More specifically, first-scan quantized data 911, first-scan and second-scan common quantized data 914, first-scan and third-scan common quantized data 915 and first-scan, second-scan and third-scan common quantized data 917 are input to a first quantized data combination section 407-1. The first quantized data combination section 407-1 combines the quantized data 911, 914, 915 and 917 (logical sum in this embodiment) and generates first-scan combined quantized data 921. Moreover, second-scan quantized data 912, first-scan and second-scan common quantized data 914, second-scan and third-scan common quantized data 916 and first-scan, second-scan and third-scan common quantized data 917 are input to a second quantized data combination section 407-2. The second quantized data combination section 407-2 combines the quantized data 912, 914, 916 and 917 and generates second-scan combined quantized data 922. Furthermore, third-scan quantized data 913, first-scan and third-scan common quantized data 915, second-scan and third-scan common quantized data 916 and first-scan, second-scan and third-scan common quantized data 917 are input to a third quantized data combination section 407-3. The third quantized data combination section 407-3 combines the quantized data 913, 915, 916 and 917 and generates third-scan combined quantized data 923. By performing the processing described above it is possible to generate printing data for three passes. With this embodiment, the effect obtained in the first embodiment can be achieved in multi-pass printing of three passes or more. In this way quantized data are combined for each relative scan of the printing head over the printing medium.

In this embodiment, exclusive error-diffusion as explained in the first embodiment is applied as the quantization process. However, the quantization process that can be applied to this embodiment is not limited to this method. For example, it may be possible to apply an independent error-diffusion process or independent dither process as explained in the embodiment that use three kinds of error-diffusion matrices or embodiment that uses a dither method. Moreover, the quantization process that can be applied to this embodiment is not limited to binarization processing, and three-value or four-value or greater quantization processing as was explained in the other embodiment can be applied.

Moreover, in this embodiment, division processing was performed so that common multi-valued data is generated for all combinations of first, second and third scans; however, the division processing that can be applied in this embodiment is not limited to this. For example, it is possible to generate common multi-valued data so that overlapping dots are generated between certain scans (first scan and second scan). In that case, in addition to first-scan multi-valued data 901, second-scan multi-valued data 902 and third-scan multi-valued data 903, it is possible to generate only first-scan and second-scan common multi-valued data 904 as common multi-valued data, and not generate first-scan and third-scan common multi-valued data 905, second-scan and third-scan common multi-valued data 906 or first-scan, second-scan and third-scan common multi-valued data 907.

The technical idea of the present invention is the creation of pixels in which dots are printed in at least two scans, and accordingly, regardless of the number of multi passes, by generating corresponding multi-valued data that is common for at least two scans, it is possible to obtain the effect of the present invention. Therefore, in the present invention, when performing printing by M (M is an integer 2 or greater) scans, in addition to multi-valued data that corresponds to M scans, corresponding multi-valued data that is common for at least two scans may be generated and it is not necessary to generate multi-valued data that is common for all M scans.

Furthermore, forms that are obtained by suitably combining the embodiments described above as another embodiment are included within the range of the present invention.

In the embodiments described above, the case of using a serial-type printer that performs multi-pass printing by ejecting in from a printing head while the printing head moves with respect to a printing medium (relative scan) is explained. However a printing to which the present invention is applied is not limited to this type of printing apparatus. The present invention may be applied to a full-line type printing apparatus that performs multi-pass printing by ejecting ink while a printing medium is conveyed with respect to a printing head (relative scan). For example, a system is possible in which there is one printing head for one ink color, and a plurality of relative scans is performed by moving the printing head back and forth with respect to a printing medium. That is, the present invention may be applied as long as multi-pass printing is performed during relative scan between a printing head and printing medium.

Moreover, examples of binarization or three-value quantization were explained for the embodiments described above. However, the quantization processing that can be applied to the present invention is not limited to this, and 4-value or greater quantization processing can be applied. In other words, in the present invention, N-value (N is an integer 2 or greater) quantization can be applied. Therefore, a form in which the embodiments described above are changed to N-value quantization processing is included in the range of the present invention.

Furthermore, in the embodiments described above, a form in which the four colors of ink CMYK are used was explained. However the number of types of ink that can be used is not limited to this. It is possible to add light cyan (Lc) and light magenta (Lm) ink to the for colors of ink above, and it is also possible to add special inks such as red ink (R) or blue ink (B). In addition, in the embodiments described above, the case was explained in which a color printing mode is executed that uses a plurality of colors of ink; however, the present invention can also be applied to a mono color mode in which only a single color of ink is used. Furthermore, the present invention can be applied to not only a color printer, but also a monochrome printer.

In the embodiments described above, the image processing apparatus that executes the image processing that is a feature of the present invention was explained using an example of a printer (image formation apparatus) that comprises a control unit 3000 having an image processing function; however, the present invention is not limited to this kind of construction. Construction can be such that a host apparatus (for example the PC 3010 in FIG. 3) in which a printer driver is installed executes the image processing that is a feature of the present invention. In that case, the host apparatus that is connected to the printer corresponds to the image processing apparatus of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-281953, filed Dec. 11, 2009, which is hereby incorporated by reference herein in its entirety.

What is claimed is:

1. An image processing apparatus for printing an image on a unit area of a printing medium by performing a plurality of relative scans between a printing unit for ejecting inks and the printing medium, said apparatus comprising:
a generating unit configured to generate first and second multi-valued data of an image to be printed on the unit area by each of the first and second relative scans of the plurality of relative scans and third multi-valued data of an image to be printed on the unit area by both of the first and second relative scans among the plurality of relative scans, based on the multi-valued image data corresponding to the image to be printed on the unit area, wherein the gradation value of third multi-valued data is determined according to the gradation value of the multi-valued image data; and
an obtaining unit configured to obtain a first data used for printing in the first relative scan based on the first multi-valued data and the third multi-valued data and second data used for printing in the second relative scan based on the second multi-valued data and the third multi-valued data.

2. The image processing apparatus according to claim 1, wherein said generating unit divides the multi-valued image data according to the division ratios, which make a percentage of a value of the third multi-valued data in the case that the gradation value of the multi-valued image data corresponding to the unit area is smaller than a first threshold value or is greater than a second threshold value that is greater than the first threshold value than that in the case that the gradation value of the multi-valued image data corresponding to the unit area is a value between the first threshold value and the second threshold value.

3. A non-transitory computer readable medium storing a program that makes the computer function as an image processing apparatus according to claim 1.

4. The image processing apparatus according to claim 1, wherein the first data, second data, and third data are obtained by quantizing the first multi-valued data, the second multi-valued data, and the third multi-valued data respectively by using an error diffusion process.

5. The image processing apparatus according to claim 4, further comprising a quantization unit configured to perform quantization processing for each of the first, second and third multi-valued data generated by said generating unit to generate the first, second, and third data, respectively.

6. An image processing apparatus that, for printing an image on a unit area of a printing medium by performing a plurality of relative scans between a printing unit for ejecting inks of plurality of colors and the printing medium, processes multi-valued image data that corresponds to the image to be printed on the unit area, said apparatus comprising:
a selecting unit configured to select a second processing mode in the case that the gradation value of the multi-valued image data is smaller than a first threshold value or is greater than a second threshold value that is greater than the first threshold value, and select a first processing mode in the case that the gradation value of the multi-valued image data is a value between the first threshold value and the second threshold value; and
a processing portion configured to perform the processing mode selected by said selecting unit,
wherein the first processing mode is a mode that performs an image processing including (A) a first division process for dividing the multi-valued image data into respective multi-valued data that correspond to each of the plurality of relative scans and multi-valued data that corresponds commonly to at least two relative scans among the plurality of relative scans, (B) a first quantization process for quantizing each of the multi-valued data obtained by the first division process to generate respective quantized data that correspond to each of the plurality of relative scans and quantized data that corresponds commonly to the at least two relative scans among the plurality of relative scans, and (C) a combination process for combining the quantized data generated by the first quantization process for each corresponding relative scan to generate combined quantized data that corresponds to each of the plurality of relative scans, and the second processing mode is a mode that performs an image processing including (D) a second quantization process for quantizing the multi-valued data to generate quantized data, and (E) a second division process for dividing the quantized data generated by the second quantization process into respective divided quantized data that correspond to each of the plurality of relative scans.

7. The image processing apparatus according to claim 6, wherein said selecting unit selects the first processing mode for the multi-valued image data of the unit area that corresponds to a first relative position on the printing medium among relative positions which is changed by the relative scan between the printing unit and the printing medium, and select the second processing mode for the multi-valued image data of the unit area that corresponds to a second relative position on the printing medium, in which a position error of the relative position is smaller than that of the first relative position, among the relative positions, regardless of the gradation value of the multi-valued image data.

8. An image processing method for printing an image on a unit area of a printing medium by performing a plurality of relative scans between a printing unit for ejecting inks and the printing medium, said method comprising:

generating first and second multi-valued data of an image to be printed on the unit area by each of the first and second relative scans of the plurality of relative scans and third multi-valued data of an image to be printed on the unit area by both of the first and second relative scans among the plurality of relative scans, based on multi-valued image data corresponding to the image to be printed on the unit area, wherein the gradation value of third multi-valued data is determined according to the gradation value of the multi-valued image data; and obtaining a first data used for printing in the first relative scan based on the first multi-valued data and the third multi-valued data and second data used for printing in the second relative scan based on the second multi-valued data and the third multi-valued data.

9. The image processing method according to claim 8, wherein said generating step divides the multi-valued image data according to the division ratios, which make a percentage of a value of the third multi-valued data in the case that the gradation value of the multi-valued image data corresponding to the unit area is smaller than a first threshold value or is greater than a second threshold value that is greater than the first threshold value than that in the case that the gradation value of the multi-valued image data corresponding to the unit area is a value between the first threshold value and the second threshold value.

10. The image processing method according to claim 8, wherein the first data, second data, and third data are obtained by quantizing the first multi-valued data, the second multi-valued data, and the third multi-valued data respectively by using an error diffusion process.

11. The image processing method according to claim 10, further comprising performing quantization processing for each of the first, second and third multi-valued data generated by said generating unit to generate the first, second, and third data, respectively.

\* \* \* \* \*